United States Patent
Sweis et al.

(10) Patent No.: US 9,405,135 B2
(45) Date of Patent: Aug. 2, 2016

(54) SHUTTER EYEWEAR

(71) Applicant: IpVenture, Inc., Los Altos, CA (US)

(72) Inventors: Jason Sweis, San Jose, CA (US); Vivian Liane Rice, Campbell, CA (US); David Chao, Saratoga, CA (US); Zhiyang Guo, Hercules, CA (US)

(73) Assignee: IpVenture, Inc., Los Altos, CA (US)

( * ) Notice: Subject to any disclaimer, the term of this patent is extended or adjusted under 35 U.S.C. 154(b) by 141 days.

(21) Appl. No.: 14/072,784

(22) Filed: Nov. 5, 2013

(65) Prior Publication Data

US 2014/0132913 A1    May 15, 2014

Related U.S. Application Data

(60) Provisional application No. 61/722,760, filed on Nov. 5, 2012.

(51) Int. Cl.
*G02C 1/00* (2006.01)
*G02C 11/00* (2006.01)
*G02C 7/10* (2006.01)

(52) U.S. Cl.
CPC ............... *G02C 11/10* (2013.01); *G02C 7/101* (2013.01)

(58) Field of Classification Search
CPC ...... G02C 2202/16; G02C 7/12; G02C 11/10; G02C 2202/20
USPC ............... 351/158, 159.39, 159.49, 159.6; 348/42, 53, 51, 78; 359/464, 465; 349/15; 382/154; 352/62; 353/7
See application file for complete search history.

(56) References Cited

U.S. PATENT DOCUMENTS

| | | |
|---|---|---|
| 320,558 A | 6/1885 | Hull |
| 669,949 A | 3/1901 | Underwood |
| 1,255,265 A | 2/1918 | Zachara |
| 1,917,745 A | 7/1933 | Weiss |
| 2,249,572 A | 7/1941 | Lieber |
| 2,638,532 A | 5/1953 | Brady |
| 2,794,085 A | 5/1957 | De Angelis |
| 2,818,511 A | 12/1957 | Ullery et al. |
| 2,830,132 A | 4/1958 | Borg |
| 2,874,230 A | 2/1959 | Carlson |
| 2,904,670 A | 9/1959 | Calmes |
| 3,060,308 A | 10/1962 | Fortuna |
| 3,597,054 A | 8/1971 | Winter |
| 3,710,115 A | 1/1973 | Jubb |
| 3,883,701 A | 5/1975 | Delorenzo |

(Continued)

FOREIGN PATENT DOCUMENTS

| | | |
|---|---|---|
| CA | 2 487 391 | 12/2003 |
| CN | 88203065 | 11/1988 |

(Continued)

OTHER PUBLICATIONS

Election Requirement for U.S. Appl. No. 14/211,491, dated Jul. 16, 2015.

(Continued)

*Primary Examiner* — Hung Dang

(57) ABSTRACT

Apparatuses and methods of shuttering glasses are disclosed. One apparatus includes a first lens operable to blank for a first blocking time, a second lens operable to blank for a second blocking time, and a controller for controllably setting at least one of the first blocking time and the second blocking time.

28 Claims, 9 Drawing Sheets

(56) References Cited

U.S. PATENT DOCUMENTS

| | | |
|---|---|---|
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,856,086 A | 8/1989 | McCullough |
| 4,859,047 A | 8/1989 | Badewitz |
| 4,882,769 A | 11/1989 | Gallimore |
| 4,942,629 A | 7/1990 | Stadlmann |
| 4,962,469 A | 10/1990 | Ono et al. |
| 4,967,268 A | 10/1990 | Lipton et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,640 A | 10/1995 | Gertsikov |
| 5,457,751 A | 10/1995 | Such |
| 5,463,428 A | 10/1995 | Lipton et al. |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,533,130 A | 7/1996 | Staton |
| 5,581,090 A | 12/1996 | Goudjil |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,737,436 A | 4/1998 | Boyden et al. |
| 5,818,381 A | 10/1998 | Williams |
| 5,835,185 A | 11/1998 | Kallman et al. |
| 5,900,720 A | 5/1999 | Kallman et al. |
| 5,903,395 A | 5/1999 | Rallison et al. |
| 5,941,837 A | 8/1999 | Amano et al. |
| 5,946,071 A | 8/1999 | Feldman |
| 5,949,516 A | 9/1999 | McCurdy |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,115,177 A | 9/2000 | Vossler |
| 6,132,681 A | 10/2000 | Faran et al. |
| 6,145,983 A | 11/2000 | Schiffer |
| 6,154,552 A | 11/2000 | Koroljow et al. |
| 6,176,576 B1 | 1/2001 | Green et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,367 B1 | 10/2001 | Boyden et al. |
| 6,307,526 B1 | 10/2001 | Mann |
| 6,343,858 B1 | 2/2002 | Zelman |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |
| 6,474,816 B2 | 11/2002 | Butler et al. |
| 6,478,736 B1 | 11/2002 | Mault |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,582,075 B1 | 6/2003 | Swab et al. |
| 6,619,799 B1 | 9/2003 | Blum et al. |
| 6,629,076 B1 | 9/2003 | Haken |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 | 8/2004 | Swab et al. |
| 6,792,401 B1 | 9/2004 | Nigro et al. |
| 6,824,265 B1 | 11/2004 | Harper |
| 6,871,951 B2 | 3/2005 | Blum et al. |
| 6,912,386 B2 | 6/2005 | Himberg et al. |
| 6,929,365 B2 | 8/2005 | Swab et al. |
| 6,932,090 B1 | 8/2005 | Reschke et al. |
| 6,947,219 B1 | 9/2005 | Ou |
| 7,004,582 B2 | 2/2006 | Jannard et al. |
| 7,013,009 B2 | 3/2006 | Warren |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,289,767 B2 | 10/2007 | Lai |
| 7,312,699 B2 | 12/2007 | Chornenky |
| 7,331,666 B2 | 2/2008 | Swab et al. |
| 7,376,238 B1 | 5/2008 | Rivas et al. |
| 7,380,936 B2 | 6/2008 | Howell et al. |
| 7,401,918 B2 | 7/2008 | Howell et al. |

(56) References Cited

U.S. PATENT DOCUMENTS

| | | | |
|---|---|---|---|
| 7,405,801 B2 * | 7/2008 | Jacobs | ............................ 352/85 |
| 7,429,965 B2 | 9/2008 | Weiner | |
| 7,438,409 B2 | 10/2008 | Jordan | |
| 7,438,410 B1 | 10/2008 | Howell et al. | |
| 7,445,332 B2 | 11/2008 | Jannard et al. | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,512,414 B2 | 3/2009 | Jannard et al. | |
| 7,527,374 B2 | 5/2009 | Chou | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,648,236 B1 | 1/2010 | Dobson | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,922,321 B2 | 4/2011 | Howell et al. | |
| 7,976,159 B2 | 7/2011 | Jacobs et al. | |
| 8,109,629 B2 | 2/2012 | Howell et al. | |
| 8,142,015 B2 | 3/2012 | Paolino | |
| 8,337,013 B2 | 12/2012 | Howell et al. | |
| 8,430,507 B2 | 4/2013 | Howell et al. | |
| 8,434,863 B2 | 5/2013 | Howell et al. | |
| 8,465,151 B2 | 6/2013 | Howell et al. | |
| 8,485,661 B2 | 7/2013 | Yoo et al. | |
| 8,500,271 B2 | 8/2013 | Howell et al. | |
| 8,770,742 B2 | 7/2014 | Howell et al. | |
| 8,905,542 B2 | 12/2014 | Howell et al. | |
| 9,033,493 B2 | 5/2015 | Howell et al. | |
| 2001/0005230 A1 | 6/2001 | Ishikawa | |
| 2001/0028309 A1 | 10/2001 | Torch | |
| 2002/0017997 A1 | 2/2002 | Felkowitz | |
| 2002/0021407 A1 | 2/2002 | Elliot | |
| 2002/0081982 A1 | 6/2002 | Schwartz et al. | |
| 2002/0084990 A1 | 7/2002 | Peterson, III | |
| 2002/0089639 A1 | 7/2002 | Starner et al. | |
| 2002/0090103 A1 | 7/2002 | Calisto, Jr. | |
| 2002/0098877 A1 | 7/2002 | Glezerman | |
| 2002/0101568 A1 | 8/2002 | Eberl et al. | |
| 2002/0109600 A1 | 8/2002 | Mault et al. | |
| 2002/0140899 A1 | 10/2002 | Blum et al. | |
| 2002/0159023 A1 | 10/2002 | Swab | |
| 2002/0197961 A1 | 12/2002 | Warren | |
| 2003/0018274 A1 | 1/2003 | Takahashi et al. | |
| 2003/0022690 A1 | 1/2003 | Beyda et al. | |
| 2003/0032449 A1 | 2/2003 | Giobbi | |
| 2003/0062046 A1 | 4/2003 | Wiesmann et al. | |
| 2003/0065257 A1 | 4/2003 | Mault et al. | |
| 2003/0067585 A1 | 4/2003 | Miller et al. | |
| 2003/0068057 A1 | 4/2003 | Miller et al. | |
| 2003/0083591 A1 | 5/2003 | Edwards et al. | |
| 2003/0214630 A1 | 11/2003 | Winterbotham | |
| 2003/0226978 A1 | 12/2003 | Ribi et al. | |
| 2004/0000733 A1 | 1/2004 | Swab et al. | |
| 2004/0029582 A1 | 2/2004 | Swab et al. | |
| 2004/0063378 A1 | 4/2004 | Nelson | |
| 2004/0096078 A1 | 5/2004 | Lin | |
| 2004/0100384 A1 | 5/2004 | Chen et al. | |
| 2004/0128737 A1 | 7/2004 | Gesten | |
| 2004/0150986 A1 | 8/2004 | Chang | |
| 2004/0156012 A1 | 8/2004 | Jannard et al. | |
| 2004/0157649 A1 | 8/2004 | Jannard et al. | |
| 2004/0160571 A1 | 8/2004 | Jannard | |
| 2004/0160572 A1 | 8/2004 | Jannard | |
| 2004/0160573 A1 | 8/2004 | Jannard et al. | |
| 2004/0197002 A1 | 10/2004 | Atsumi et al. | |
| 2004/0227219 A1 | 11/2004 | Su | |
| 2005/0067580 A1 | 3/2005 | Fontaine | |
| 2005/0078274 A1 | 4/2005 | Howell et al. | |
| 2005/0088365 A1 | 4/2005 | Yamazaki et al. | |
| 2005/0201585 A1 | 9/2005 | Jannard et al. | |
| 2005/0213026 A1 | 9/2005 | Da Pra' | |
| 2005/0230596 A1 | 10/2005 | Howell et al. | |
| 2005/0238194 A1 | 10/2005 | Chornenky | |
| 2005/0239502 A1 | 10/2005 | Swab et al. | |
| 2005/0248717 A1 | 11/2005 | Howell et al. | |
| 2005/0248718 A1 | 11/2005 | Howell et al. | |
| 2005/0248719 A1 | 11/2005 | Howell et al. | |
| 2005/0264752 A1 | 12/2005 | Howell et al. | |
| 2006/0001827 A1 | 1/2006 | Howell et al. | |
| 2006/0003803 A1 | 1/2006 | Thomas et al. | |
| 2006/0023158 A1 | 2/2006 | Howell et al. | |
| 2006/0107822 A1 | 5/2006 | Bowen | |
| 2006/0132382 A1 | 6/2006 | Jannard | |
| 2007/0030442 A1 | 2/2007 | Howell et al. | |
| 2007/0046887 A1 | 3/2007 | Howell et al. | |
| 2007/0055888 A1 | 3/2007 | Miller et al. | |
| 2007/0098192 A1 | 5/2007 | Sipkema | |
| 2007/0109491 A1 | 5/2007 | Howell et al. | |
| 2007/0186330 A1 | 8/2007 | Howell et al. | |
| 2007/0208531 A1 | 9/2007 | Darley et al. | |
| 2007/0270663 A1 | 11/2007 | Ng et al. | |
| 2007/0271065 A1 | 11/2007 | Gupta et al. | |
| 2007/0271116 A1 | 11/2007 | Wysocki et al. | |
| 2007/0271387 A1 | 11/2007 | Lydon et al. | |
| 2007/0279584 A1 | 12/2007 | Howell et al. | |
| 2008/0062338 A1 | 3/2008 | Herzog et al. | |
| 2008/0068559 A1 | 3/2008 | Howell et al. | |
| 2008/0144854 A1 | 6/2008 | Abreu | |
| 2008/0151179 A1 | 6/2008 | Howell et al. | |
| 2008/0158506 A1 | 7/2008 | Fuziak | |
| 2008/0218684 A1 | 9/2008 | Howell et al. | |
| 2008/0262392 A1 | 10/2008 | Ananny et al. | |
| 2008/0278678 A1 | 11/2008 | Howell et al. | |
| 2009/0059159 A1 | 3/2009 | Howell et al. | |
| 2009/0141233 A1 | 6/2009 | Howell et al. | |
| 2009/0147215 A1 | 6/2009 | Howell et al. | |
| 2009/0156128 A1 | 6/2009 | Franson et al. | |
| 2009/0296044 A1 | 12/2009 | Howell et al. | |
| 2010/0061579 A1 | 3/2010 | Rickards et al. | |
| 2010/0079356 A1 | 4/2010 | Hoellwarth | |
| 2010/0110368 A1 | 5/2010 | Chaum | |
| 2010/0245754 A1 | 9/2010 | Matsumoto et al. | |
| 2010/0296045 A1 | 11/2010 | Agnoli et al. | |
| 2010/0309426 A1 | 12/2010 | Howell et al. | |
| 2011/0102734 A1 | 5/2011 | Howell et al. | |
| 2011/0187990 A1 | 8/2011 | Howell et al. | |
| 2012/0050668 A1 | 3/2012 | Howell et al. | |
| 2012/0133885 A1 | 5/2012 | Howell et al. | |
| 2013/0308089 A1 | 11/2013 | Howell et al. | |
| 2014/0176902 A1 | 6/2014 | Sweis et al. | |
| 2014/0198293 A1 | 7/2014 | Sweis et al. | |
| 2014/0268008 A1 | 9/2014 | Howell et al. | |
| 2014/0268013 A1 | 9/2014 | Howell et al. | |
| 2014/0268017 A1 | 9/2014 | Chao et al. | |
| 2014/0361185 A1 | 12/2014 | Howell et al. | |
| 2015/0085245 A1 | 3/2015 | Howell et al. | |
| 2015/0230988 A1 | 8/2015 | Chao et al. | |
| 2015/0253590 A1 | 9/2015 | Howell et al. | |

FOREIGN PATENT DOCUMENTS

| | | |
|---|---|---|
| CN | 89214222.7 | 3/1990 |
| CN | 90208199.3 | 11/1990 |
| DE | 10123226 A1 | 11/2002 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002 341059 A | 11/2002 |
| JP | 2002-151292 | 6/2005 |
| TW | 484711 | 6/2001 |
| WO | WO 97/12205 A1 | 4/1997 |
| WO | WO 99/50706 A1 | 10/1999 |
| WO | WO 01/06298 A1 | 1/2001 |
| WO | WO 02/06881 A2 | 1/2002 |

(56) References Cited

FOREIGN PATENT DOCUMENTS

| WO | WO 03/069394 A1 | 8/2003 |
|---|---|---|
| WO | WO 03/100368 A1 | 12/2003 |
| WO | WO 2004/012477 A2 | 2/2004 |
| WO | WO 2004/025554 A1 | 3/2004 |
| WO | WO 2010/014154 A2 | 12/2010 |

OTHER PUBLICATIONS

Office Action for U.S. Appl. No. 14/211,491, dated Oct. 19, 2015.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop", Product-Features, eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.

"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Pediatric Eye Disease Group,"Randomized Trial of Treatment of Amblyopia in Children Aged 7 to 17 Years," Roy W. Beck, M.D., Ph.D. Section Ed., Originally Published and Reprinted from Arch Ophthalmol, v. 123, Apr. 2005, pp. 437-447, http;//archopht.jamanetwork.com/ by a new England College of Optometry User on Dec. 20, 2012.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Holmes, JM et al. "A randomized trial of prescribed patching regimens for treatment of severe amblyopia in children." Ophthalmology, v. 110, Iss.11, Nov. 2003, pp. 2075-2087.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
RazrWire, copyright Motorola, Inc., Jul. 2005, 1 page.

(56) References Cited

OTHER PUBLICATIONS

Repka MX et al. "A randomized trial of patching regimens for treatment of moderate amblyopia in children." *Arch Ophthalmology* v. 121, No. 5, May 2003, pp. 603-611.

SafeSun Personal UV Meter, Scientific Data, Optix Tech Inc., http://www.safesun.com/scientific.html, downloaded May 1, 2004, pp. 1-3.

SafeSun Sensor, User's Manual, Optix Tech Inc., Jun. 1998, 2 pages.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experiments.html, downloaded Feb. 5, 2004, pp. 1-2.

Shades of Fun, Blinking Light Glasses, http://www.shadesoffun.com/Nov/Novpgs-14.html, downloaded Jul. 9, 2005, pp. 1-4.

SportLine Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp. 1-3.

SunUV™, Personal UV Monitor User's Guide, APA Optics, Inc., 2003 pp. 1-52.

SunUV™, Personal UV Monitor, APA Optics, Inc., http://www.apaoptics.com/sunuv/models.html, downloaded Dec. 20, 2003.

Talking Pedometer, Sportline, Inc., Jun. 2001 (Possibly earlier), 1 page.

The unofficial ELSA 3D Revelator page, Dec. 30, 1999, pp. 1-15.

Top Silicon PIN Photodiode, PD93-21C, Technical Data Sheet, Everlight Electronics Co., Ltd., 2004, pp. 1-9.

UV Light Meter, UVA and UVB measurement, UV-340, Instruction Manual, Lutron, Jun. 2003 (estimated), pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter, http://www.auravita.com/products/AURA/ORBU11420.asp. Downloaded Nov. 15, 2005, pp. 1-4.

Wallace DK et al. "A randomized trial to evaluate 2 hours of daily patching for strabismic and anisometropic amblyopia in children." *Ophthalmology* v. 113, No. 6, Jun. 2006, pp. 904-912.

Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.

\* cited by examiner

SHUTTER EYEWEAR

CROSS-REFERENCE TO RELATED APPLICATIONS

This patent application claims priority to U.S. patent application Ser. No. 61/722,760, filed Nov. 5, 2012, which is hereby incorporated herein by reference.

The patent application claims priority to U.S. patent application Ser. No. 13/615,447, filed Sep. 13, 2012, which is hereby incorporated herein by reference.

The patent application claims priority to U.S. Provisional Patent Application No. 61/700,852, filed Sep. 13, 2012, which is hereby incorporated herein by reference.

The patent application claims priority to U.S. Provisional Patent Application No. 61/535,341, filed Sep. 15, 2011, and U.S. Provisional Patent Application No. 61/556,083, filed Nov. 4, 2011 which are hereby incorporated herein by reference.

FIELD OF THE DESCRIBED EMBODIMENTS

The described embodiments relate generally to electronic eyewear. More particularly, the described embodiments relate to apparatuses, methods and systems for shutter glasses.

BACKGROUND OF THE INVENTION

In newborn children, the nerves and brain function that control eye movement and image processing begin to converge during the first 9 months after birth. Sometimes this natural process can go wrong and their eyes can start to cross inward (esotropia) or separate outwards (exotropia). This can prevent the brain from receiving simultaneous overlapping images from each eye to provide a true 3D depth realization. Surgery is sometimes needed to bring the eyes back into reasonable alignment but the brain still may suppress one eye or the other. In other situations, though the eyes are aligned, one eye can become dominant and the other "lazy" (amblyopia). Again the brain needs to learn how to process the images from both eyes simultaneously and equally. The nerves that control the eye muscles and receive the input of each eye need to be trained such as for binocular or stereo vision.

In small children with vision problems, the best results happen if therapy is started before the age of six when the wiring becomes mostly permanent. The older the child gets, the harder it is to correct the defects. So their defective eyesight should be corrected as early as possible. However, there are challenges in working with very young children. For example, they have more difficulty comprehending the need for the therapy; and they may not be able to execute instructions for vision therapy, particularly when the tasks are boring to them. The challenge is further exacerbated when the training session requires performing certain tasks repetitively for a long duration of time.

Instead of performing vision therapy, some parents opt for corrective eye surgery. For example, surgery could bring crossed eye back into near alignment. However, even after the surgery, their brain still prefers to use one eye over another. They need to be trained or to be retrained to see with both eyes.

Such eye defects are not limited to small children. Adults may need vision therapy also. For example, according to one study, two or more percent of the population in the United States do not have stereo vision.

It is desirable to have methods, systems and apparatuses for providing vision therapy to address the eye ailments described above.

SUMMARY OF THE INVENTION

An embodiment includes an apparatus. The apparatus includes a first lens operable to blank for a first blocking time, a second lens operable to blank for a second blocking time, and a controller for controllably setting at least one of the first blocking time and the second blocking time.

Another embodiment includes a method of providing vision therapy to a user. The method includes blanking a first lens of shutter glasses being worn by the user for a first blocking time, blanking a second lens of shutter glasses being worn by the user for a second blocking time, and controllably setting at least one of the first blocking time and the second blocking time.

DETAILED DESCRIPTION OF THE INVENTION

One of the described embodiments encourages the use of both eyes simultaneously so that the brain does not suppress input from one eye. Another embodiment forces an amblyopic eye to work harder.

In one embodiment, the lenses could be LCD lenses.

One embodiment shutters the two lenses by alternately blanking the left and the right lens back and forth. For example, the shuttering speed of the lenses can be adjusted. This can be done, for example, by a knob, a slider or a small dial on the corresponding frame to program the frequency of the blanking. The switching speed can range from a few milliseconds to a short number of seconds. In another example, the switching frequency can range from 1 Hz to 15 Hz (such as in 1 Hz increment). In yet another example, the switching frequency can range from 6 to 10 Hz (such as in 0.5 Hz increment).

In another embodiment, the duty cycle of the blanking of the left and the right lens during the switching can be controlled. For example, their phase relationship can be 90 degrees, or at some other degrees. In another example, an amblyopic eye can be forced to work harder by having its corresponding lens turned on longer than the other lens. In yet another example, the shutter lenses can have different blocking times for each lens depending on which eye is more dominant or lazy.

In one embodiment, the different attributes of the shutter lenses can be programmable via switches on the corresponding frame or wirelessly via a remote control.

In one embodiment, the shutter lenses with the corresponding control circuitry and power source can be in a secondary frame (e.g., auxiliary frame), which is attachable to a primary frame (which can be a frame supporting prescription lenses) via different mechanisms, such as magnets or clips.

In one embodiment, the shutter lenses with the corresponding control circuitry and power source can be in a fit-over frame that can fit over another frame.

In one embodiment, the shutter lenses can be integrated into prescription lenses providing focal correction, such as bi-focal, tri-focal, prism, etc.

In one embodiment, the shutter lenses can auto-modulate to provide shading capability when used in sunny areas while still providing alternating vision blocking as described above.

In one embodiment, the shutter glasses are rechargeable or include power sources, such as a battery, to allow the glasses to perform its operation over a duration of time, such as a few hours.

In one embodiment, the shutter glasses may be secured from the back with a functional strap, such as a lanyard, that may contain the control circuitry and power source. This can provide additional ergonomic qualities and securing for active patients.

In one embodiment, the shutter glasses can be marketed to optometrists and ophthalmologists.

In yet another embodiment, the shutter frequency for the two lenses can be independently controlled.

Figure 1:
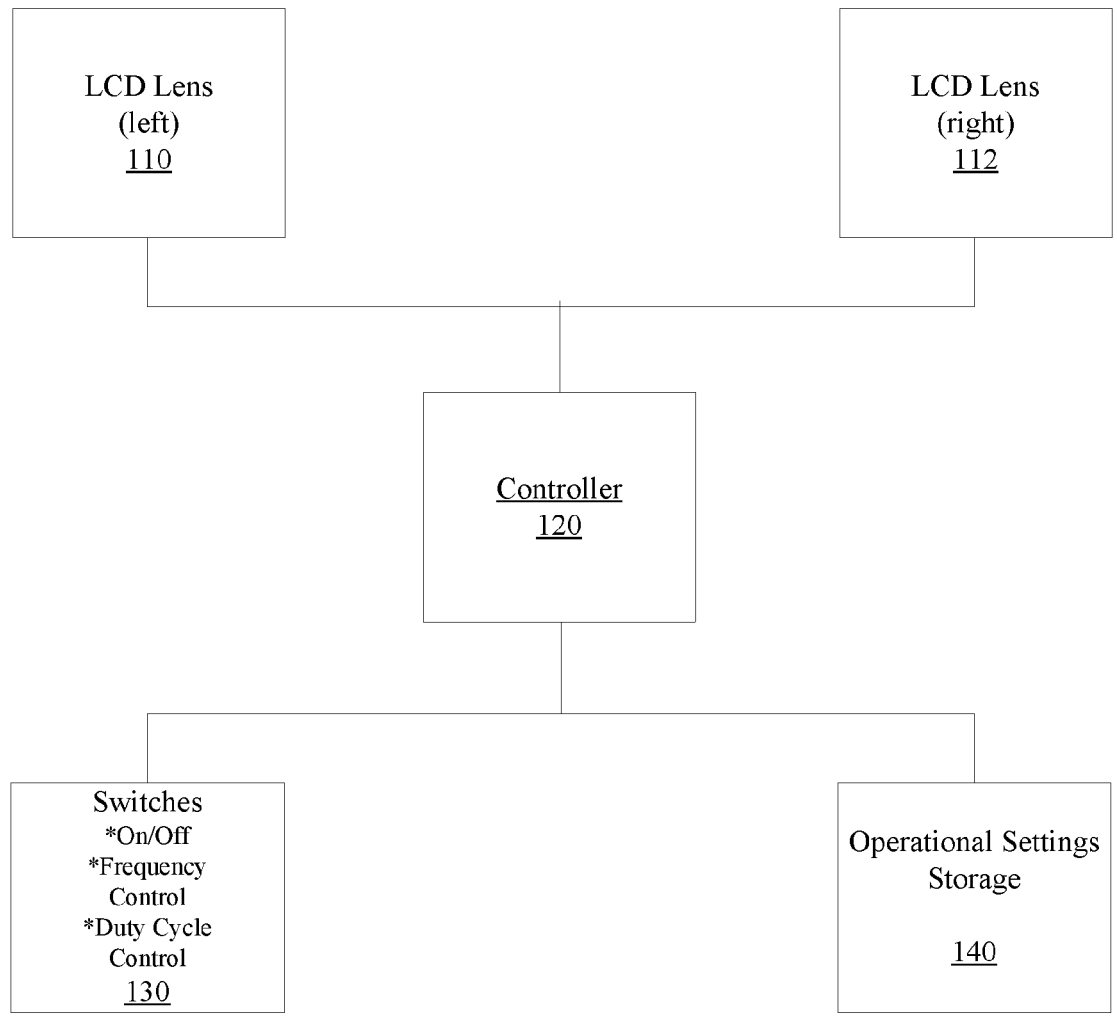
FIG. 1 shows a block diagram of electronic shutter glasses according to an embodiment.

FIG. 1 shows a block diagram of electronic shutter glasses according to an embodiment. As shown, this embodiment of the shutter glasses includes a left lens 110 and a right lens 112. For an embodiment, the left lens 110 and the right lens 112 include LCD lenses.

For an embodiment, a controller 120 provides control of at least one of frequency or blocking period (blocking time) of at least one of the first lens 110 or the second lens 112. For an embodiment, the left lens 110 operable to blank for a first blocking time, the right lens operable to blank for a second blocking time, and the controller 120 controllably sets at least one of the first blocking time and the second blocking time. For an embodiment, the control of at least one of frequency or blocking period is adjustable. For an embodiment, the control of the first lens 110 is independent of the control of the second lens 112. For an embodiment, the controller 120 is at least partially controlled by switches 130 that provide at least one of on/off control, frequency control, and/or duty cycle control. For an embodiment, the frequency of the shuttering (switching from a non-block condition or state to a blocking condition or state) is the same for both lenses, but the blocking time or duty cycle of one lens is different than the blocking time or duty cycle of the other lens, thereby forcing one eye of a user to work harder than the other eye.

For an embodiment, the controller 120 is operable to access operational settings of at least the frequency and/or duty cycle from operational setting storage 140. For an embodiment, the operational settings can be adaptively updated depending upon an eye ailment a user of the shutter glasses is suffering from. Additionally, for an embodiment, the storage 140 is used for storing monitoring information that can be accessed.

Figure 2:
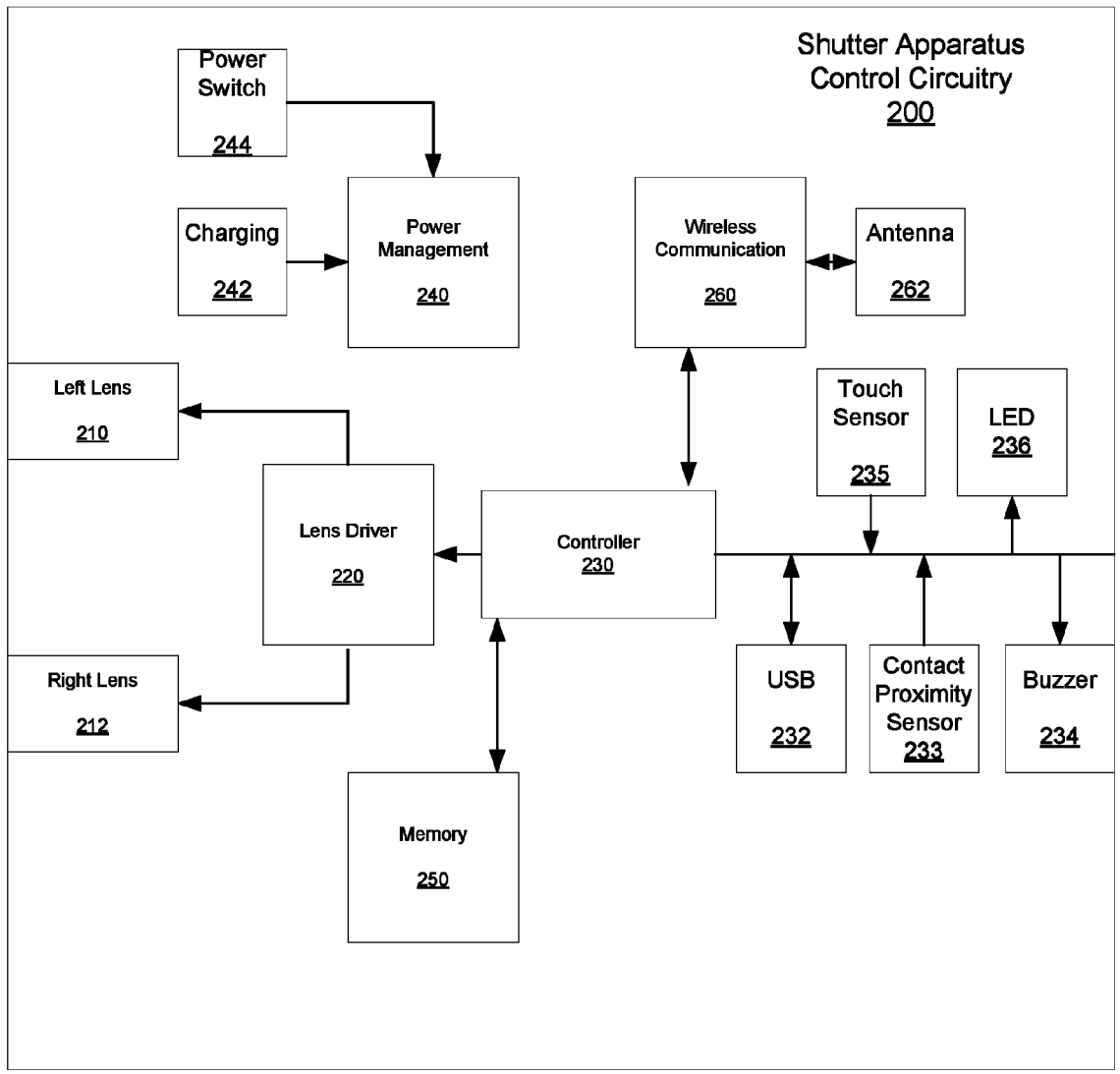
FIG. 2 shows a block diagram of electronic shutter glasses according to another embodiment.

FIG. 2 shows a block diagram of electronic shutter glasses according to another embodiment. This embodiment provides examples of different types of functionality that can be included with the shuttering glasses control circuitry 200.

An embodiment includes a controller 230 that controls at least one of frequency or blocking times of at least one of a left lens 210 and a right lens 212. The controller 230 can interface with an external controller.

For an embodiment, the controller 230 interfaces with a lens driver 220 that drives states of the left lens 210 and the right lens 212. For an embodiment, the lenses 210, 212 include LCD lenses. Accordingly, for this embodiment, the lens driver is an LDC lens driver.

For an embodiment, the states of the left lens 210 and the right lens 212 include a blocking state (the lens being opaque and not letting light pass through) and a non-blocking state (the lens being transparent and letting a majority of light pass through). An embodiment includes intermediate states that allow varying amount of light pass through the lenses depending upon the intermediate state. The process of blanking includes the lenses alternating between blocking and non-blocking.

For an embodiment, the controller 230 interfaces with memory 250. For an embodiment, the controller 230 accesses from the memory 250 stored operational modes of the states of the left lens 210 and the right lens 212. For an embodiment, the controller 230 stores operational information of the shuttering glasses in the memory 250 for future access. For an embodiment, the operational information includes user usage of the shuttering glasses. For an embodiment, the operational information includes monitored or collected information of the user. The monitored information can be access by an external controller, thereby allowing determination of compliance by the user of the shutter glasses. That is, compliance by the user properly wearing the shutter glasses for a prescribed duration of time can be determined by accessed storage of wearing times and patterns by the user of the shutter glasses.

An embodiment includes power management 240 of the shuttering glasses. For an embodiment, the shuttering glasses include a battery. For an embodiment, a charging unit 242 controls charging of the battery. An embodiment includes a power switch 244. For an embodiment, the power management 240 provides and distributes electrical power to, for example, at least one of the lens driver 220, the controller 230, the memory 250, wireless communication circuitry, a touch sensor 235, an LED (light emitting diode) 236, a USB (universal serial bit) interface 232, a contact sensor 233 and/or a buzzer 234.

An embodiment includes wireless communication circuitry 260 that allows the controller 230 to communicate with an external controller. For an embodiment, wireless communication circuitry 260 is two-way in that the controller 230 can either provide the external controller with information, or the controller 230 can receive information from the external controller. An embodiment further includes an antenna 262 for enabling the wireless communication. The wireless communication can be continuous or intermittent.

An embodiment includes the touch sensor 235. For an embodiment the touch sensor 235 allows a user to communicate with the controller 230. For an embodiment, the touch sensor 235 allows the controller 230 to monitor the user of the shutter glasses.

An embodiment includes the LED 236. For an embodiment, the LED 236 allows the shutter glasses to provide visual communication to, for example, the user. For an embodiment, the LED 236 provides a visual indicator that the shutter glasses have electrical power indicating, for example, that the shutter glasses are electrically turned on.

An embodiment includes the USB port 232 for providing wired communication to or from the controller 230. For example, an external controller can communicate with the controller 230 through the USB port 232.

An embodiment includes the contact/proximity sensor 233. For an embodiment, the contact/proximity sensor 233 provides an indication that the shutter glasses are being worn. For an embodiment, the controller 230 monitors the usage (wearing of the shutter glasses) based on the contact/proximity sensor 233.

An embodiment includes the buzzer 234. For an embodiment, the buzzer 234 provides audible communication to, for example, the user. For an embodiment, the buzzer indicates to the user that the battery is low. For at least some embodiments, the buzzer is used to provide guidance to the user. For example, the buzzer can provide an indicator to the user to either take off or put the shutter glasses on.

Figure 3:
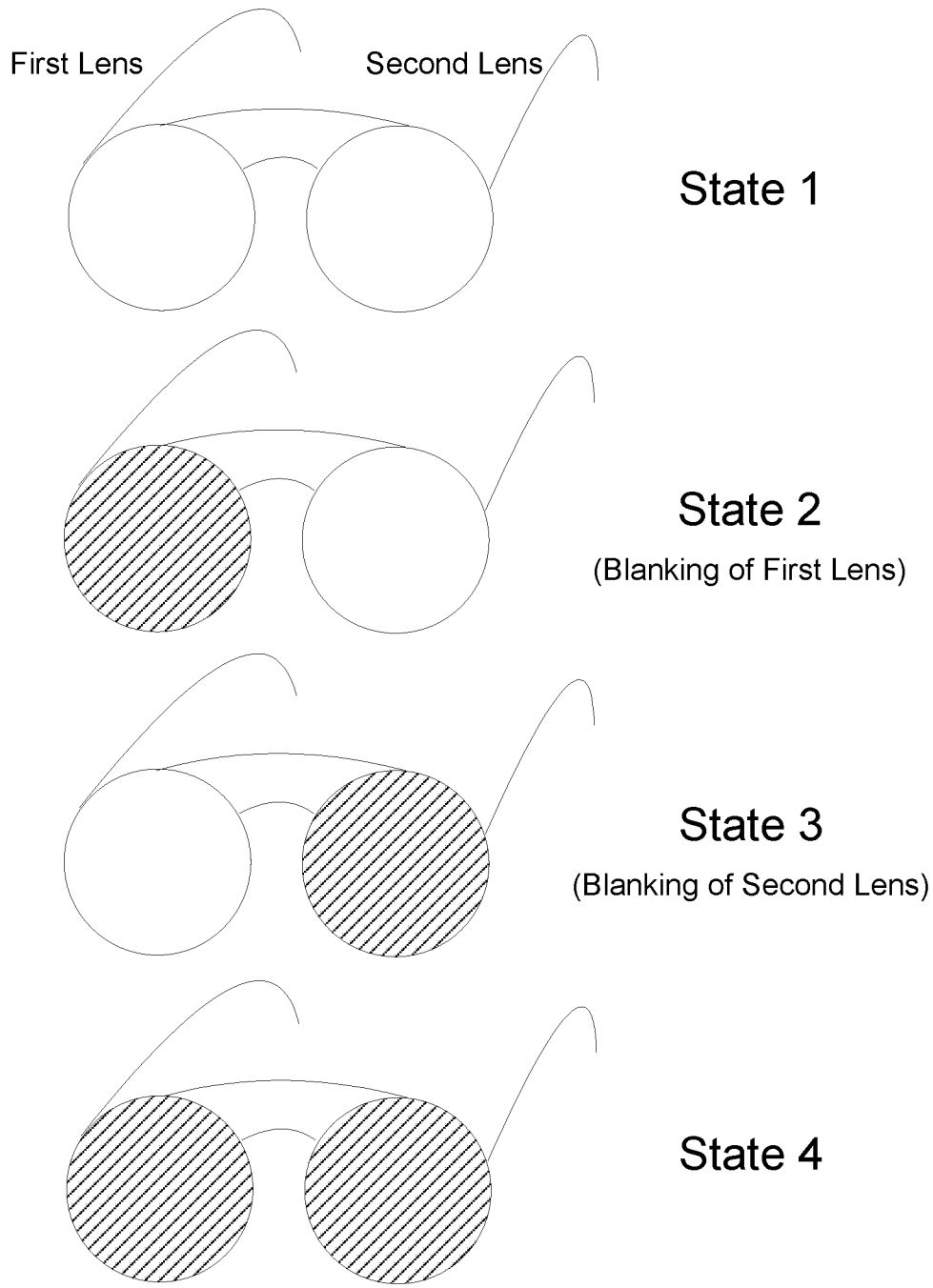
FIG. 3 shows shutter glasses in different states of operation according to an embodiment.

FIG. 3 shows shutter glasses in different states of operation according to an embodiment. As shown, an embodiment includes a first state wherein both a first lens and a second lens are in non-blocking. For an embodiment, a second state includes one lens (for example, the first lens) being in the blocking state, and the other lens (for example, the second lens) being in the non-blocking state. For an embodiment, a third state includes the other lens (such as, the second lens) being in the blocking state, and the lens (such as, the first lens) being in the non-blocking state. For an embodiment, a fourth state includes both lenses being in the blocking state. As described, at least some embodiments include controlling at least one of a frequency of the change from one state to at least one of the other states, or a blocking period (and conversely, the non-blocking period) of one or more of the states.

Figure 4:
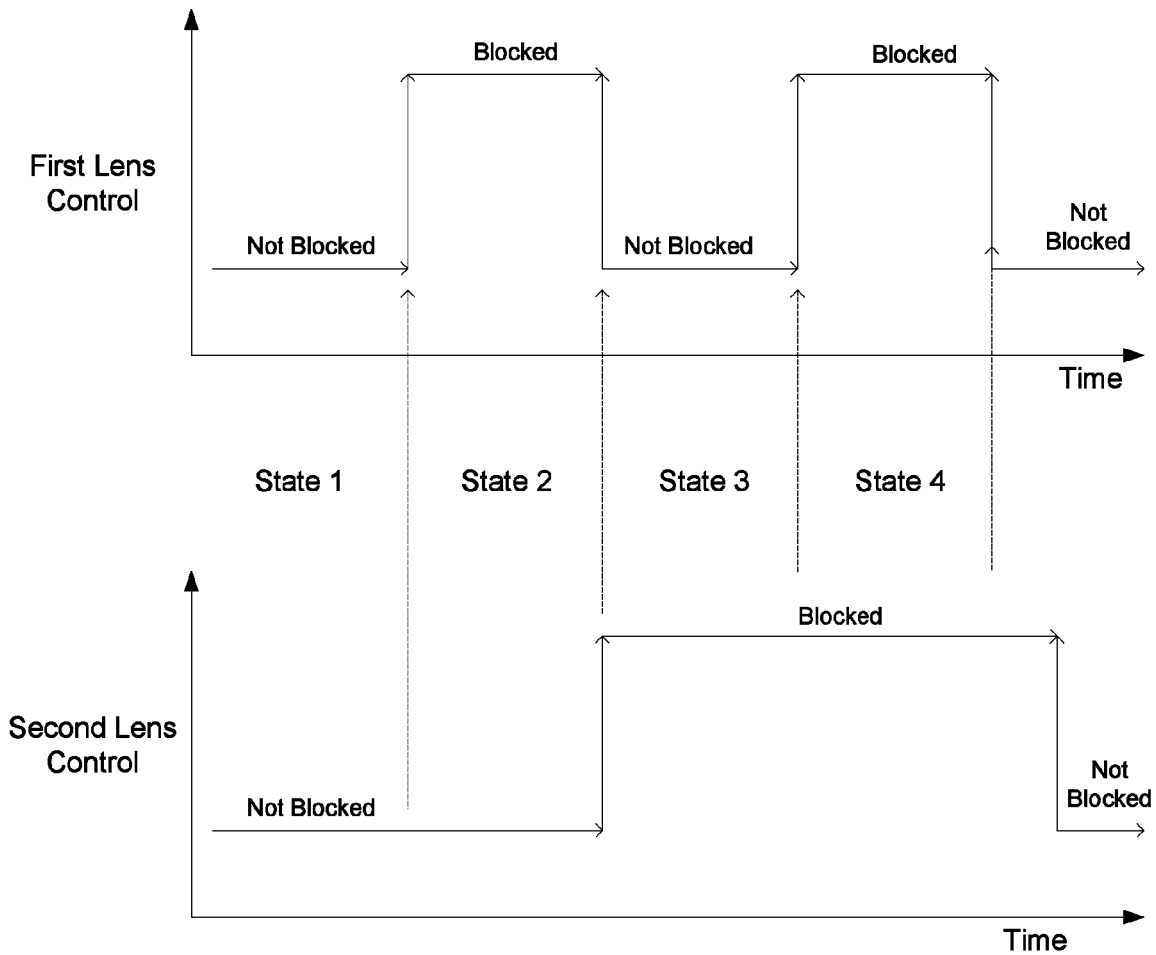
FIG. 4 shows time-lines of operation of the shutter glasses for the different states shown in FIG. 3, according to an embodiment.

FIG. 4 shows time-lines of operation of the shutter glasses for the states shown in FIG. 3, according to an embodiment. A first time line shows control of the first lens over time between being non-blocked and blocked. A second time line shows control of the second lens over time between being non-blocked and blocked. The four possible states of FIG. 3 are shown by the time-lines of FIG. 4 according to an embodiment.

Figure 5:
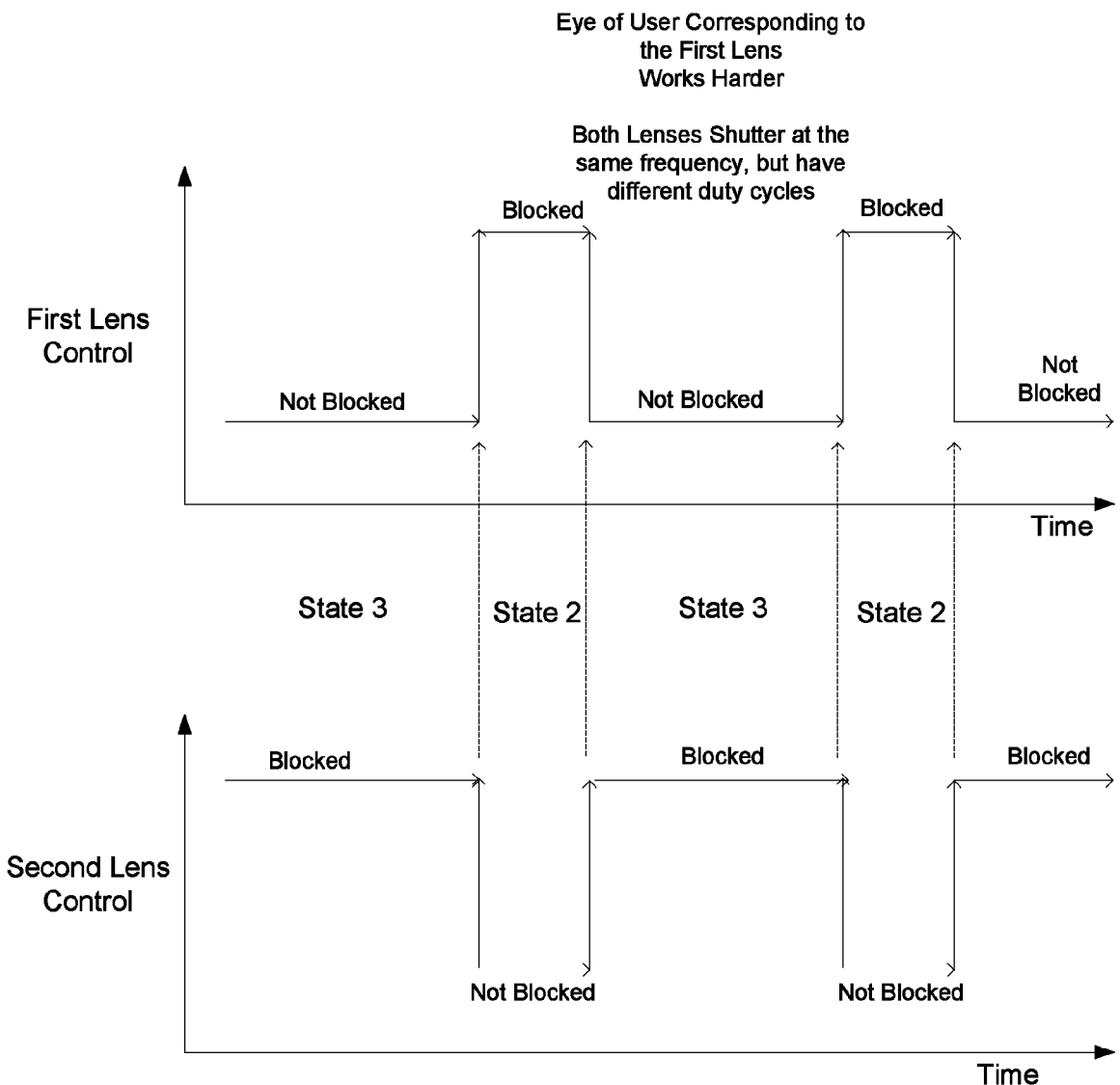
FIG. 5 shows time-lines of operation of the shutter glasses for the different states shown in FIG. 3, according to another embodiment.

FIG. 5 shows time-lines of operation of the shutter glasses for the states shown in FIG. 3, according to another embodiment. This embodiment includes the blocking period of the first lens being less than the blocking period of the second lens while alternately blanking (blocking) the left and the right lens back and forth. For this embodiment, the frequency of the shuttering of both lenses is approximately the same. The second lens is blocking for a greater percentage of a period of the frequency of the shuttering than the first lens. Accordingly, a user of the shutter glasses is forced to use vision of the eye that corresponds with the first lens a greater percentage of time. By blocking an eye (through blanking the corresponding lens) the shutter glasses force the brain of the user to switch over to the other eye. That eye (corresponding to the lens not being blanked) is forced to align properly to see the same target of interest, and the brain continues to use that eye until he cycle repeats and switches to the other eye. The shuttering causes the user of the shutter glasses to experience a combination of muscle alignment training and anti-suppression therapy.

Figure 6:
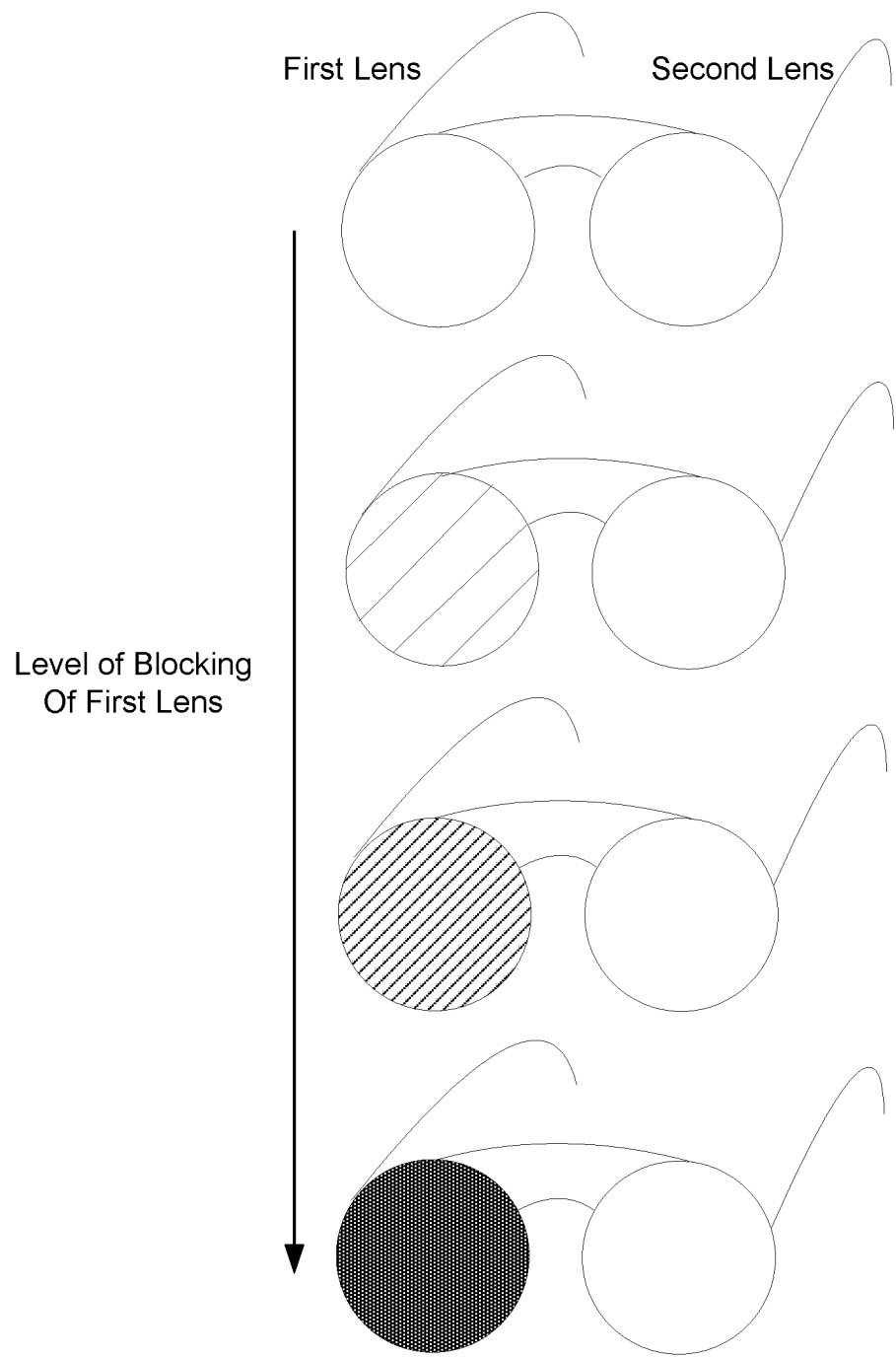
FIG. 6 shows shutter glasses that include an adjustable level of blocking, according to an embodiment.

FIG. 6 shows shutter glasses that include an adjustable level of blocking, according to an embodiment. For an embodiment, the level or degree of blocking of either of the lenses is adjustable. That is, the amount of light that passes through at least one of the shuttering glasses lenses is adjustable. FIG. 6 shows the first lens of the shuttering glasses, wherein the level or degree of the blocking is adjusted from near-transparent to near-opaque, with intermediate levels or degrees of blocking in between. For at least some embodiments, the level of blocking can be increased slowly or rapidly, and then the blocking can be independently decreased slowly or rapidly. Therapy being applied to the user of the shutter glasses can dictate how to control the blocking and the levels of blocking of either lens.

At least one embodiment includes adjusting the level according to any desired sequence. For example, the level of block can be increased or decreased as desired or programmed. The level of blocking of either lens can be dependently or independently controlled.

Figure 7:
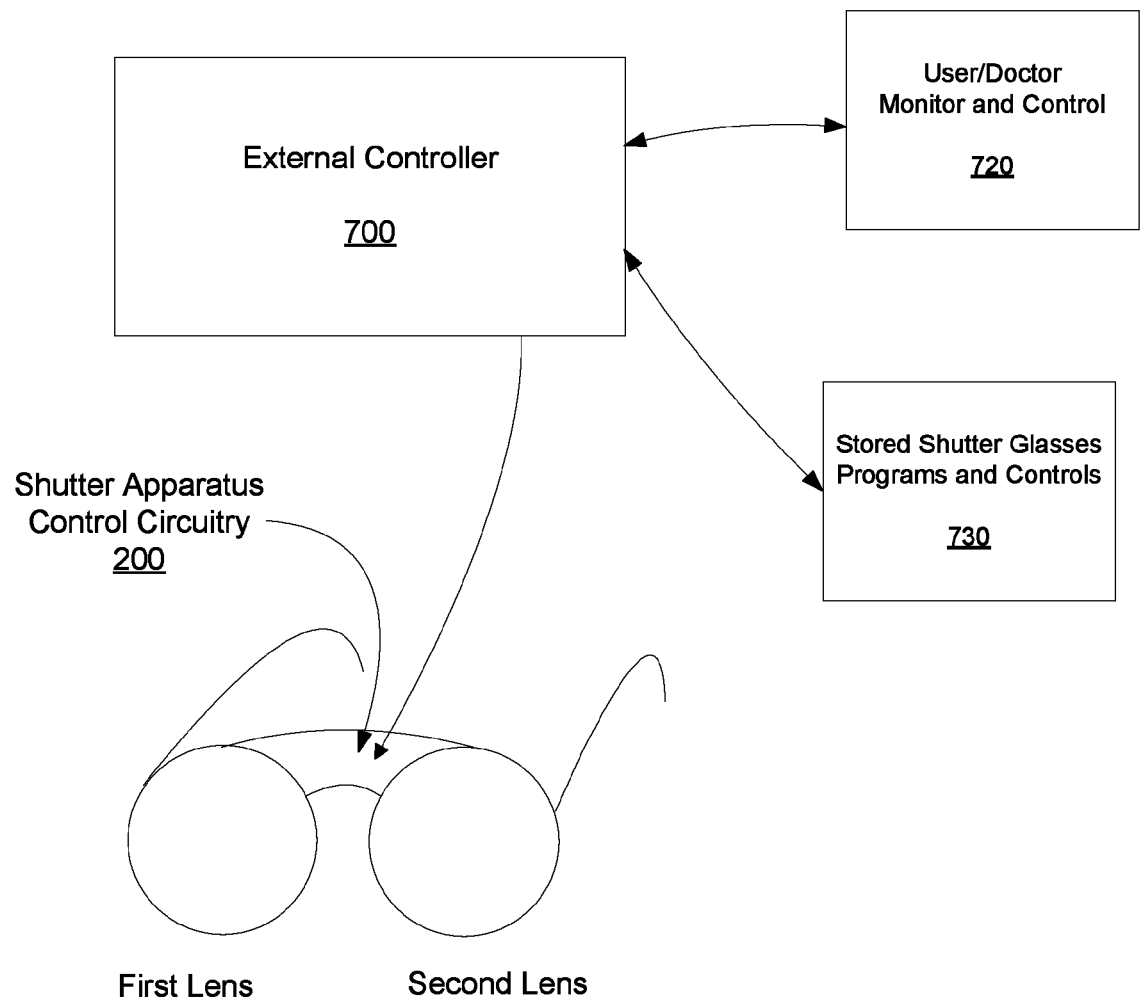
FIG. 7 shows shutter glasses interfaced with an external controller, according to an embodiment.

FIG. 7 shows shutter glasses interfaced with an external controller, according to an embodiment. For an embodiment, shuttering glasses control circuitry 200 is operable to communicate, for example, with an external controller 700. For an embodiment, the external controller allows a user or a doctor to monitor (720) the usage of the user. For an embodiment, the user or the doctor is able to program the shuttering glasses through the external controller 700. For an embodiment, the user or doctor can retrieve stored shuttering glasses program and controls 730. Accordingly, the doctor can proscribe therapy by programming the shutter glasses. Additionally, the doctor can monitor the use of the shutter glasses by the user (patient), thereby allowing the doctor to monitor compliance and use of the shutter glasses by the user. Further, sensors can be included that monitor activity by the user which can be stored.

Figure 8:
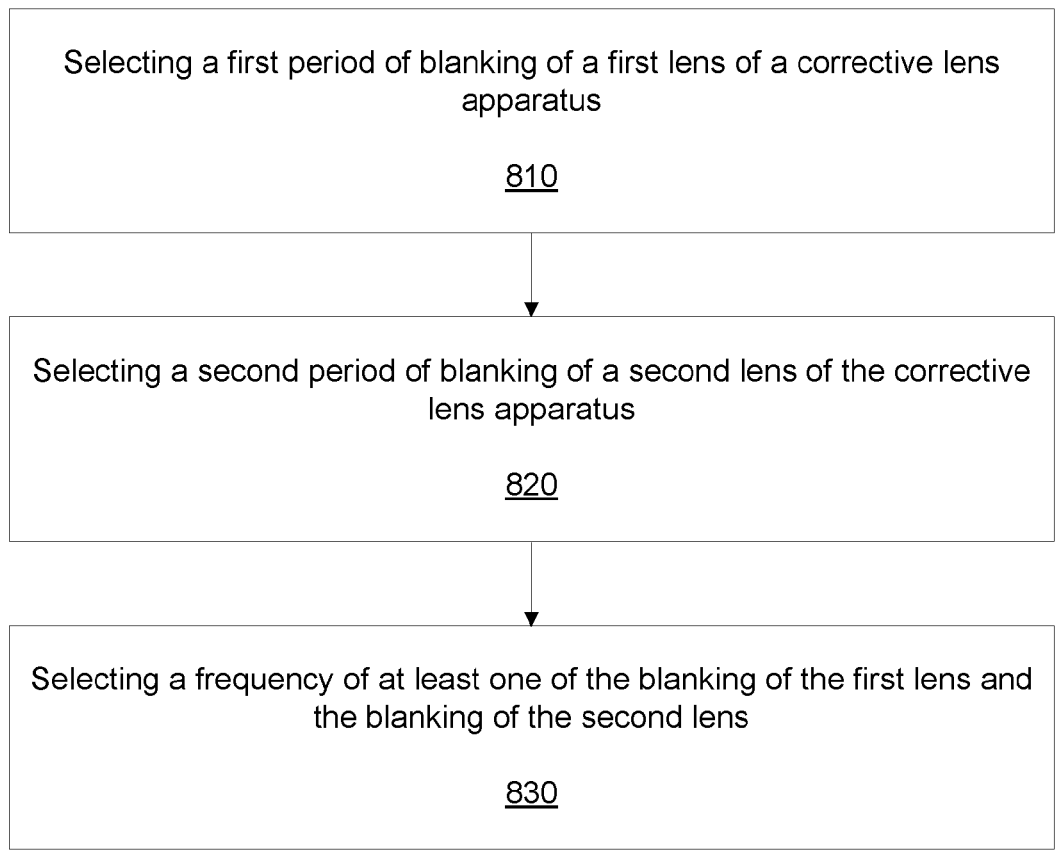
FIG. 8 is a flow chart that includes steps of a method of operating shutter glasses, according to an embodiment.

FIG. 8 is a flow chart that includes steps of a method of treating vision of a patient, according to an embodiment. A first step 810 includes selecting a first period of blanking of a first lens of a corrective lens apparatus. A second step 820 includes selecting a second period of blanking of a second lens of the corrective lens apparatus. For an embodiment, the first period and the second period are selected for treating a vision ailment of the patient. For example, the first period can be selected to be different than the second period to force one eye of the patient to work harder than the other eye of the patient. A third step 830 includes selecting a frequency of at least one of the blanking of the first lens and the blanking of the second lens. For example, particular frequencies of blanking may be determined to be more effective in treating the patient than others. For an embodiment, the frequency is selective and adjustable depending upon how the shutter glasses are programmed or set.

One embodiment of the invention encourages the use of both eyes simultaneously so that the brain does not suppress input from one eye. Another embodiment helps an amblyopic eye to work harder. Other embodiments address other issues regarding the eyes.

As previously described, in a number of embodiments, the lenses of a pair of eyewear can be shuttered, and the shutter frequency can be adjusted. For example, the two lenses can be shuttered by alternately blanking the left and the right lens back and forth, with one lens shut and the other open, and vice versa. To illustrate, the shutter frequency can range from a few milliseconds to a few seconds. In one example, the shutter frequency can range from 1 Hz to 15 Hz. In another example, the shutter frequency can range from 6 to 10 Hz. In yet another example, the shutter frequency does not exceed the frequency where the shutter can be visually perceived by an average person. As to the increment within a range, the increment can be, for example, in 0.5 Hz, 1 Hz, 2 Hz, 3 Hz, or other increments.

In at least some embodiments, various ranges of shutter frequency for one or both of the two lenses are selectable. One embodiment includes a doctor or physician (or other) selecting the range or ranges of shutter frequency based at least in part on a vision or eye ailment of a patient or user. For example, a therapy of a first ailment may be optimally provided with a first range of shutter frequencies, and a therapy of a second ailment may be optimally provided with a second range of shutter frequencies. Other factors can influence the selected range of shutter frequency as well. For example, experimentation may determine that the desired shutter frequency changes with, for example, age, time, environment, race etc. One embodiment includes a doctor or physician (or other) selecting the shutter frequency based upon the results of one or more tests performed on the patient. For example, various ranges of shutter frequency may be tested by having the patient wear a pair of shutter glasses, and while wearing the shutter glasses operating at various shutter frequencies, having the patient perform one or more tests. As illustrations, one selected range can be from one to ten hertz. Another can extend the low end of the range to a period of one or more days.

One embodiment includes sensing when the patient is actually wearing a pair of shutter glasses. This can be done, for example, by incorporating a being-worn sensor in the glasses. The sensor can determine, for example, if the temples of the glasses are in the extended position. One embodiment further includes monitoring if the user is wearing the glasses. In one embodiment, a pair of shutter glasses includes a time sensor that times at least one of how long and how frequently the patient wears the glasses. For an embodiment, the time sensor is attached to, integral with, or being a part of the shutter glasses. For an embodiment, information related to the monitoring/sensing of the glasses is stored, such as in the glasses. For an embodiment, after stored, the monitoring information can be later retrieved, for example, by a doctor or physician to allow the physician to determine or gauge the compliance (e.g. duration of time of wearing the glasses) by the patient with the therapy suggested by the doctor of physician. The retrieval can be performed wired (e.g. via an electrical connector at the glasses) or wirelessly (e.g. via an infrared sensor at the glasses).

For one embodiment, a time sensor senses when the patient puts the shutter glasses on his/her head. As described, for an embodiment, this includes a "being worn" sensor. Another embodiment includes the time sensor being activated by a triggered event, such as, pressing a button or a switch located on the glasses.

In one embodiment, a motion detector is used as the "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle of a temple, such as in a region that touches the head of the user wearing the glasses. The other sensor can be at the end of the temple, close to its hinge. If the temperature differential between the two sensors is beyond a certain preset value, the eyewear would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is fully extended outwards, the switch is turned on. The switch can be a pin. When the temple is fully extended outwards, the pin is pressed. When both temples are fully extended outwards, in one embodiment, the glasses would be assumed to be worn by the user.

In addition to monitoring pertaining to the wearing of a pair of glasses by a patient, the monitoring can include monitoring the therapies applied to the patient. In yet another embodiment, the monitoring further includes monitoring characteristics of a patient. For example, eye movement or head movements of the patient while therapy is being applied through different types of sensors in the shutter glasses. Again, the monitoring information can be stored for later retrieval. For example, a doctor or physician can retrieve the monitoring information for not only a determination of compliance by the patient, but also to obtain additional patient information obtained while the patient is wearing the glasses and being treated with therapy provided by the shutter glasses.

In one embodiment with two lenses, the shuttering of each lens is controlled by a waveform, such as a voltage waveform, and the phase relationship between the waveforms of the two lenses can be adjusted. In one example, the phase can be approximately 90 degrees. In another example, the phase relationship can be at some other degrees.

In one embodiment, the shutter frequency of the two lenses can be independently controlled.

In one embodiment, the shutter lenses described herein can also modify its transmission or tint amount. As an example, the shutter lenses can auto-modulate to provide shading capability when used in sunny areas. As another example, the amount of transmission can be reduced manually, such as via a switch at the corresponding frame, if used before a bright monitor. It has been found that in some situations, the monitor brightness is directly related to computer-inflicted eye strain. In another embodiment, the two lenses of a frame can be independently adjustable for their transmission amount.

There can be different applications to changing the transmission coefficient. One example is for amblyopic eyes. The transmission coefficient of the lens for the good eye can be reduced to a very low level, such as 10% or less, or around 5%, instead of substantially blocking all the light to the good eye. Some users may feel more comfortable if their eyes could see something, instead of having all their vision blocked.

Another application regarding tinting or mirroring the lenses of a pair of shutter glasses is to make the shuttering less conspicuous. The low-frequency shuttering of the glasses may be visible to others who are proximate to the patient, thereby potentially drawing unwanted attention to the patient. This unwanted attention may cause the patient to not wear the glasses or wear the glasses less. By tinting or mirroring the lenses of the glasses, the effects of the shuttering may be at least partially disguised, thereby reducing the potential of unwanted attention by others. The tinting or mirroring of the lenses can be realized by, for example, coating the lenses with a mirror coat. In one embodiment, such coating can be known as a flash coating or a REVO coating.

In one embodiment, the transmission coefficient of a lens is not uniform across the lens. For example, the lens can be separated into zones. Using liquid crystal as an example, a lens driver circuit can provide electrical signals to one or more zones as in addressing liquid crystal display panels. To illustrate, the zones can be columns or vertical zones. As another illustration, the zones can be rows across a lens. In yet another illustration, a zone can be a region where a row intersects a column. With columns as an example, each column can be individually addressable by its corresponding conductors to control its transmission coefficient. One application of such an implementation is to train the brain to move an eye to areas of a lens where the eye could see. Assume that each of the two lenses of a pair of glasses is separated into ten evenly-spaced columns. After detailed analysis, an optometrist decides to block light, or at least a portion of the light, coming into the left side of the left eye so as to encourage the left eye to move more towards the nose. Then the optometrist operates the lens driver circuit so that the left three columns of the left lens block off light, with the remaining seven columns allowing light to go through. In another implementation, the lens driver circuit could implement a discrete gradient change in any direction using programmable transmission for each column.

In one embodiment, the transition for shuttering is not abrupt, but is gradual. In other words, the rate of change of the transmission coefficient can be gradually, such as in a linear or sinusoidal fashion, or via other types of waveforms. In some situations, a more gradual change in the transmission coefficient, such as during shuttering, can be more soothing to the eyes.

In one embodiment where the shuttering transition is more abrupt, such as in the waveform of a substantially rectangular wave, the on/off duty cycle of the shuttering of the lenses can be controlled. In one example, the duty cycle is 50%. In another example, the duty cycle is at some other percentages. In another embodiment with two lenses, the duty cycle of each of the lenses can be independently controlled.

In one example, an amblyopic eye can be forced to work harder by having its corresponding lens turned on longer than the other lens. In another example, there can be different blocking times for each lens, depending on which eye is more dominant or lazy. In yet another example, the lens for the normal eye can be shuttered, while the lens for the amblyopic eye is left unblocked, or does not shutter.

In one embodiment with two lenses, the change in transmission characteristics of each lens is controlled by a waveform, and the waveforms for the two lenses can be different. The two waveforms can differ in frequency, transmission amount, the abruptness of the shuttering if applicable, and/or the on/off duty cycle if applicable.

In one embodiment, the one or more attributes of the shutter lenses can be programmable via one or more switches on the corresponding frame. Examples of switches on a frame can include a knob, a slider or a small dial on the corresponding frame to program, such as the frequency of the shuttering or blanking. In another example, the one or more attributes of the shutter lenses can be programmed wirelessly, such as by a remote control.

In one embodiment, the shutter lenses can be integrated into prescription lenses, providing focal correction, such as bi-focal, tri-focal, prism, etc.

In one embodiment, the shutter lenses are based on liquid crystal lens technologies.

In one embodiment, an eyewear includes a single lens. As an example, the lens could be a single wrap-around lens.

In one embodiment, a distance between each lens of, for example, a pair of shutter glasses is no less than 13 mm. That is, for shortest distance between lenses is no less than 13 mm.

In one embodiment, the electronics for the shutter lenses are in an eyewear frame with the shutter lenses. In another embodiment, the shutter lenses with the corresponding electronics, such as the control circuitry, can be in a secondary frame, which is attachable to a primary frame via different mechanisms, such as magnets. The primary frame can include a pair of prescription lenses. To illustrate, there can be a housing or a chassis holding prescription lenses, with the shutter lenses provided on the outside, such as via a clip-on. In another example, the shutter lenses with the corresponding control circuitry can be in a fit-over frame that can fit over another frame.

In one embodiment, the electronic eyewear with shutter glasses is rechargeable or includes power sources, such as a battery, to allow the glasses to perform its operation over a duration of time, such as a few hours.

In one embodiment, the shutter glasses may be secured from the back with a functional strap, such as a lanyard, that may contain the control circuitry and power source. This can provide additional ergonomic qualities and securing for active patients.

In one embodiment, the shutter glasses can be marketed to optometrists and ophthalmologists.

Figure 9A:
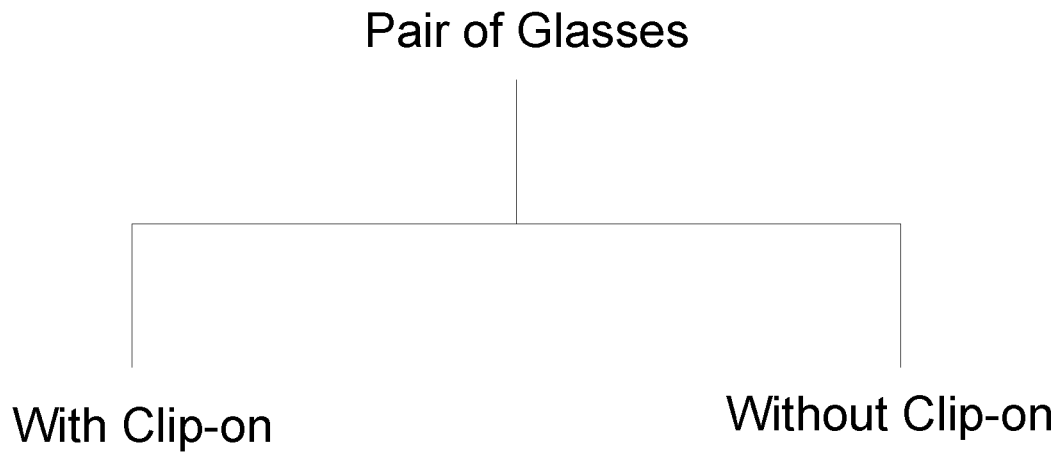
FIGS. 9A and 9B shows different embodiments of electronic eyewear.
Figure 9B:
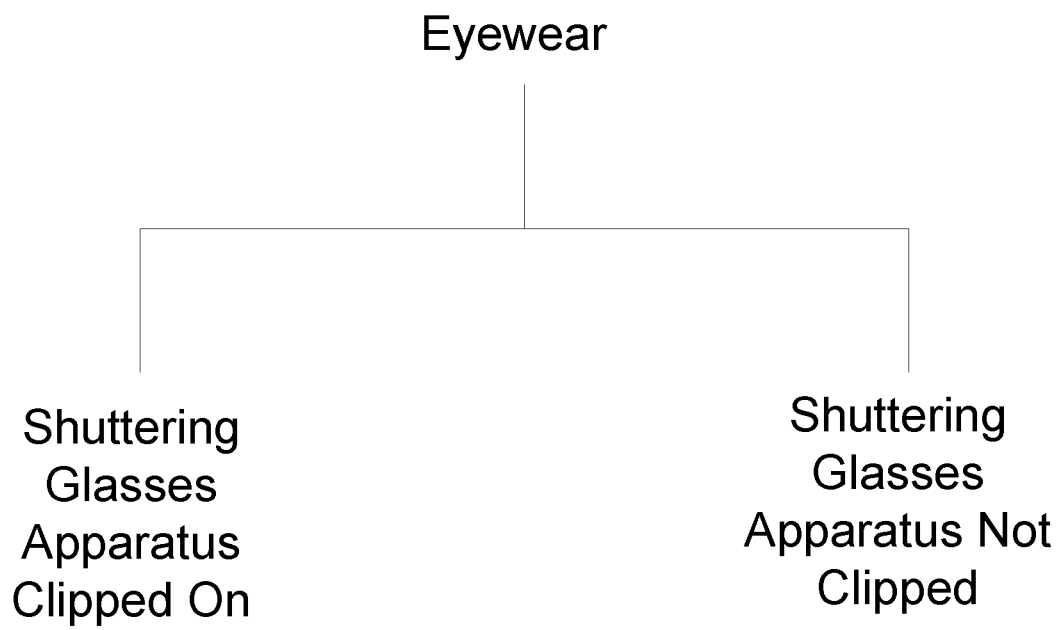

At least some embodiments (as shown in FIGS. 9A and 9B) include electronic eyewear implemented as a "clip on" over a pair of prescription frame. That is, the described embodiments that include plastic lenses, compliance sensing, compliance notification, and a bridge distance of less than 13 mm, can be implemented as a clip-on that a user can clip onto a pair of prescription glasses.

Following the claims and Abstract is an Appendix A, providing additional embodiments and also being part of this disclosure.

APPENDIX A

Plastic Lens

*Certain embodiments of eyewear disclosed herein can use flexible plastic LCD to, for example, gain the benefit of one or more of:

1. More Safe to wear, won't break
2. Durable and reduce the shipping & handling lost
3. Can be curved for variety of fashionable and pleasing design
4. Scratch-resistant coating could be on the plastic lens to prevent scratch
5. Other coatings, like antireflective coating might be used to improve the transmittance performance of the plastic part
6. High temperature tolerance lens' material will be used to adapt to the curving processing

Compliance improvement

- Compliance sensing
- Compliance notification

Compliance Sensing

Can use one or more sensors to measure and/or monitor compliance, such as:

- Touch Sensor
- Contact sensor
- Pressure sensor
- Proximity sensor
- Motion sensor

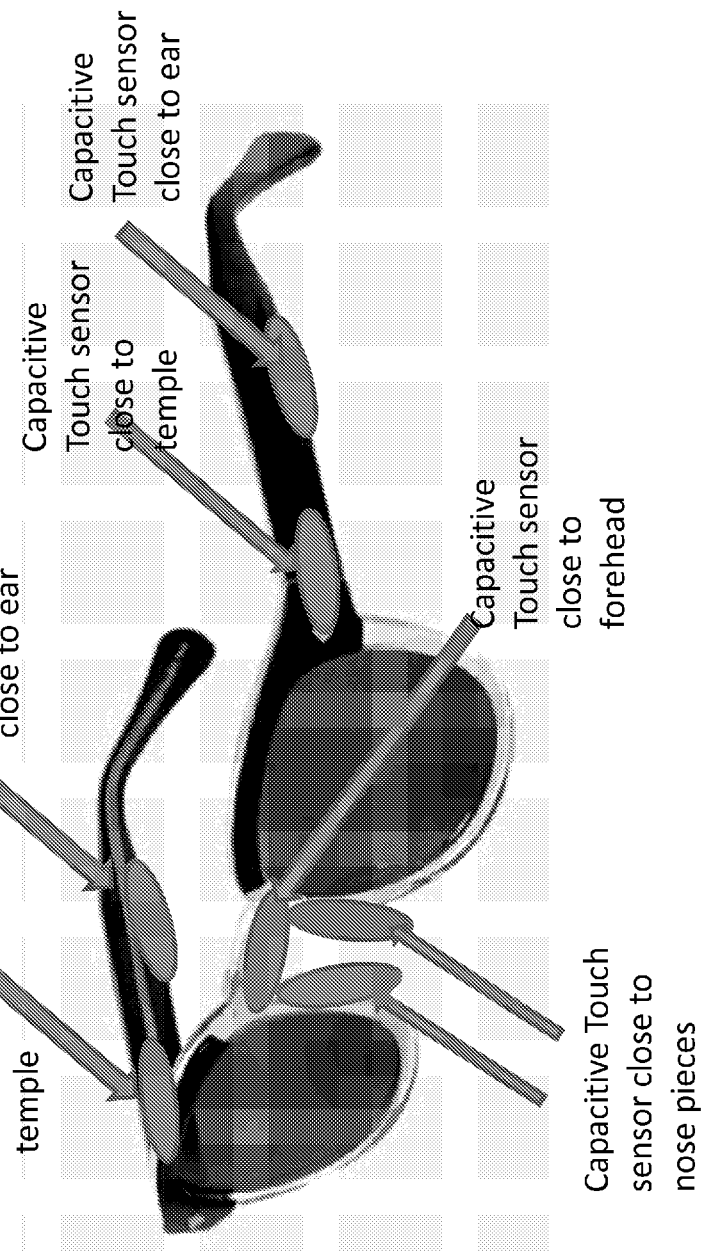

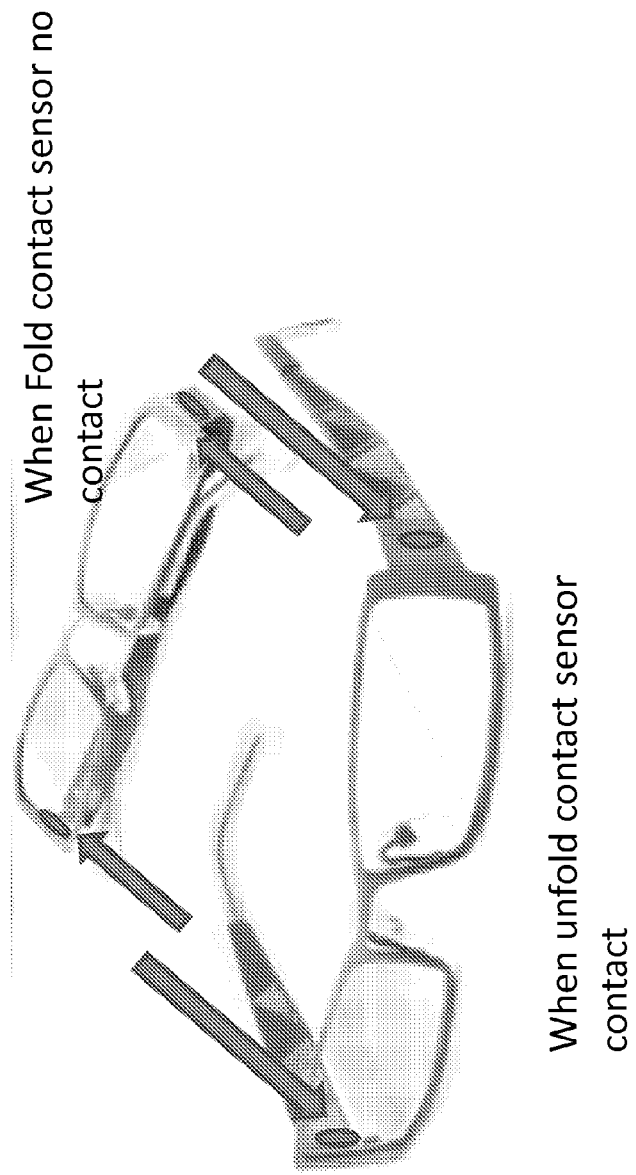

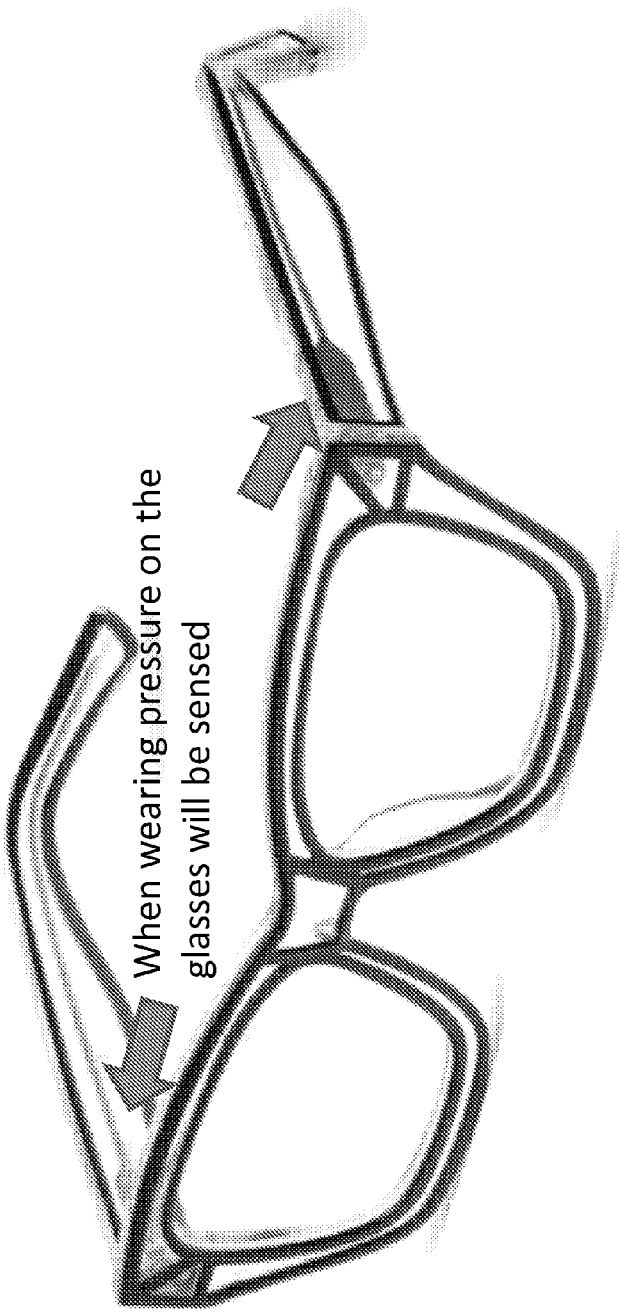

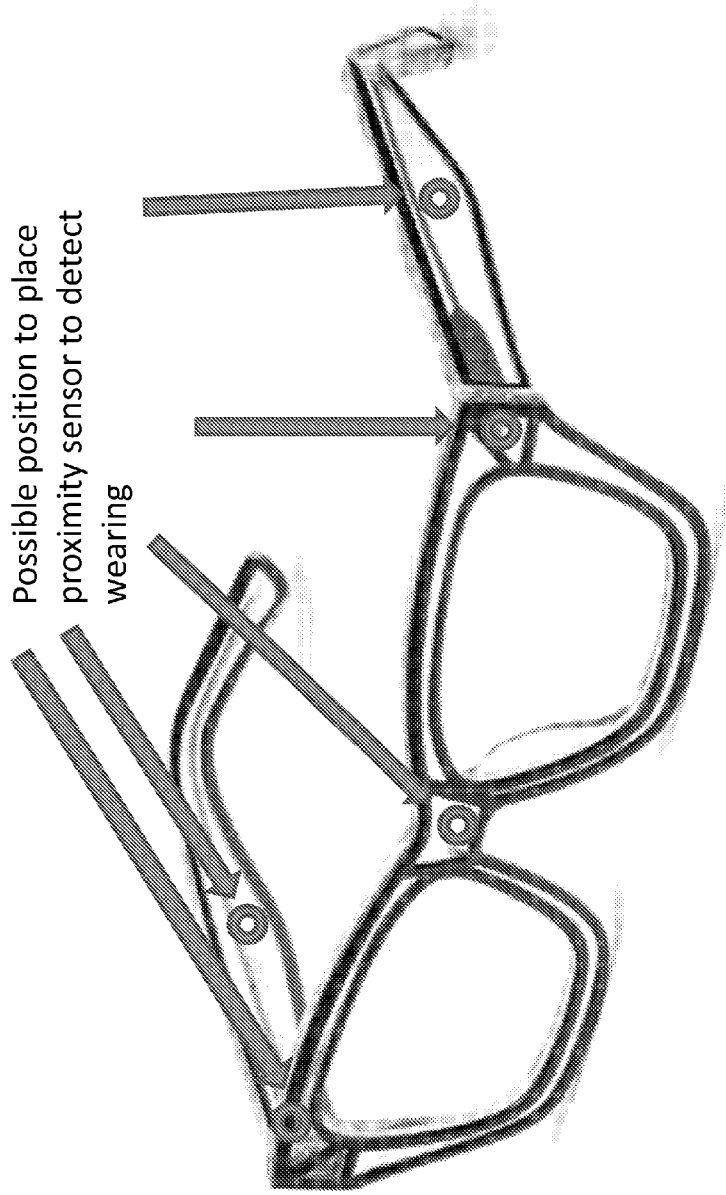

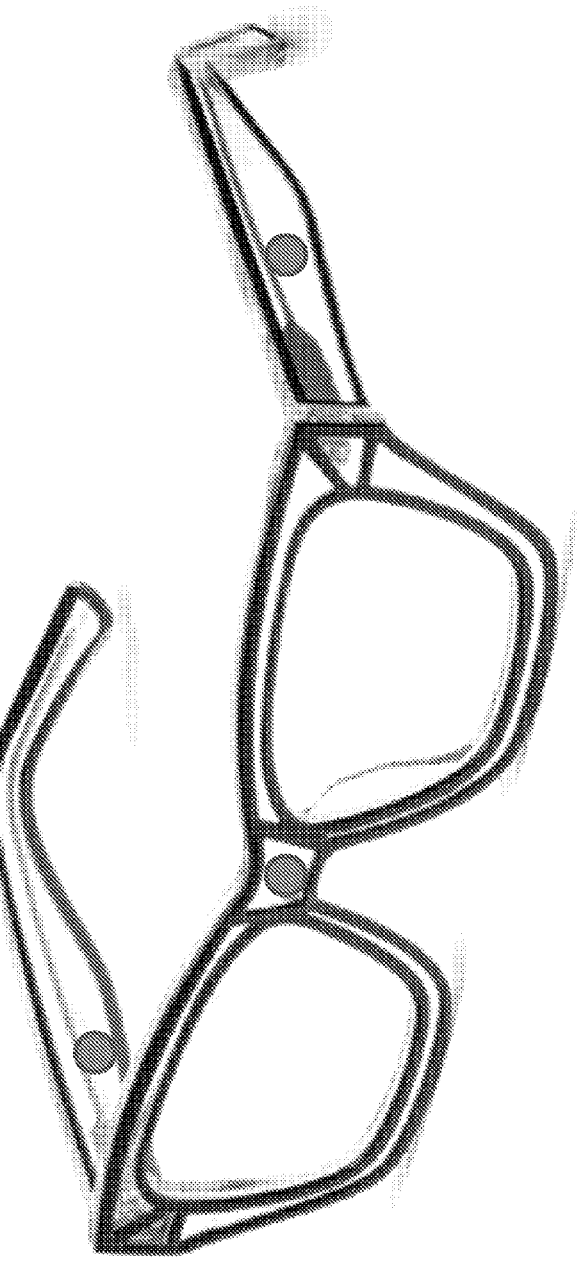

Compliance Notification

- LED light
- Buzz sound
- Music & speech play
- Notification to Smart phone, Computer, email, SMS

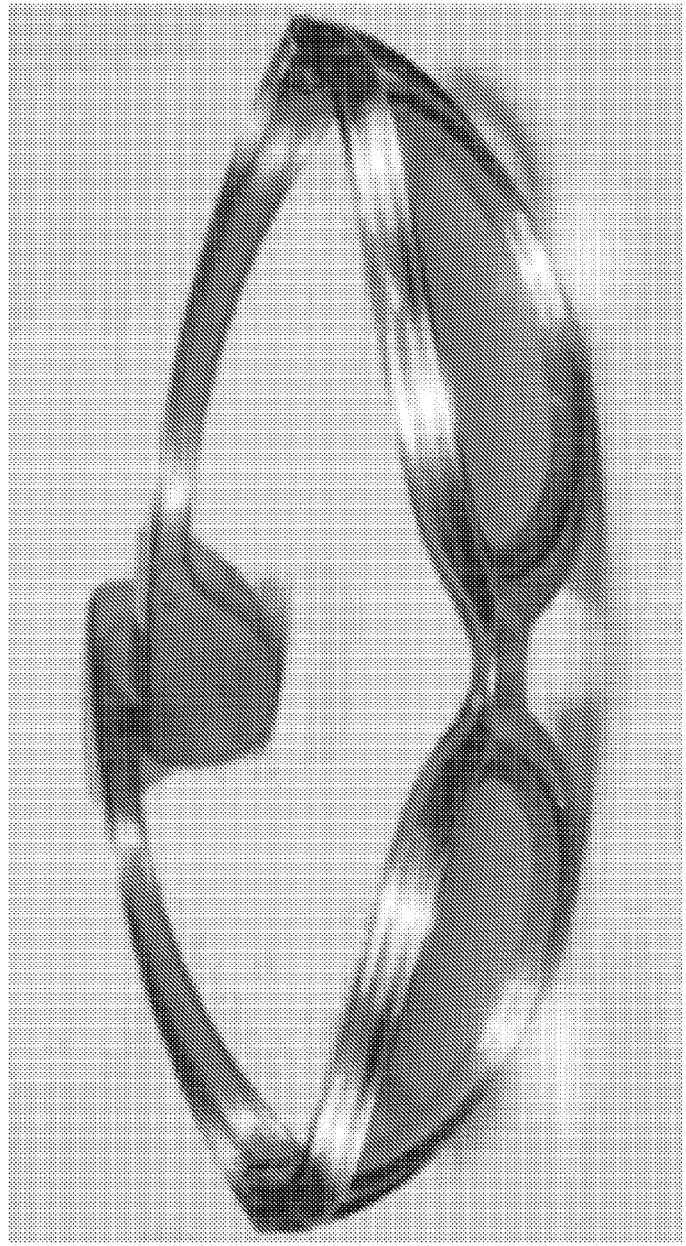

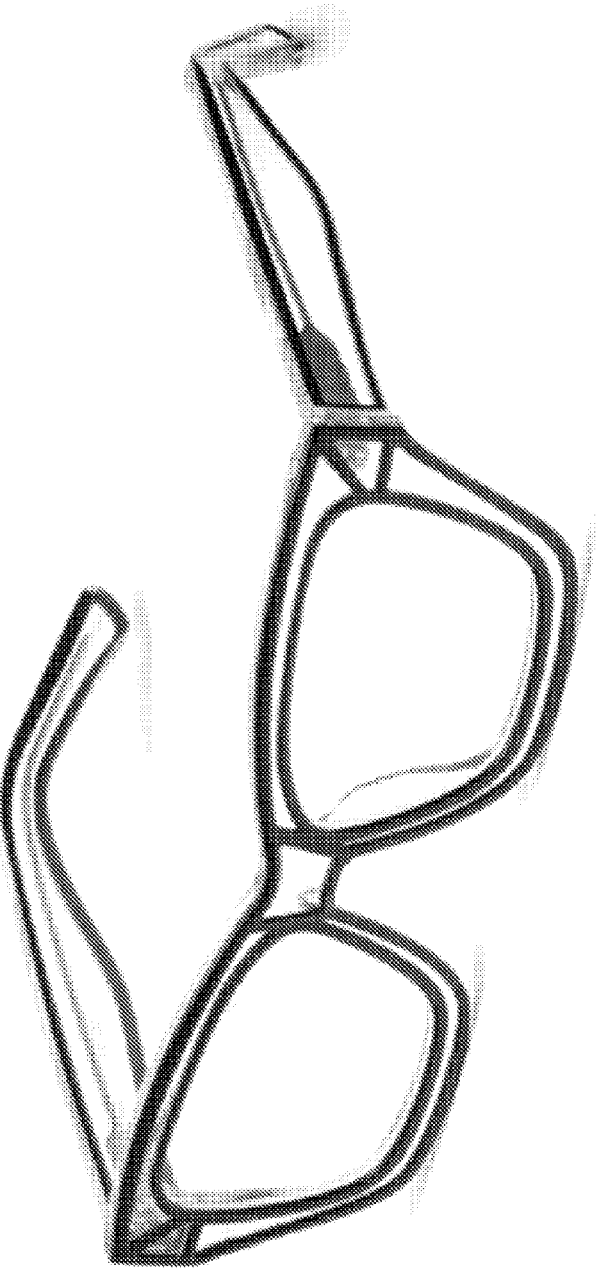

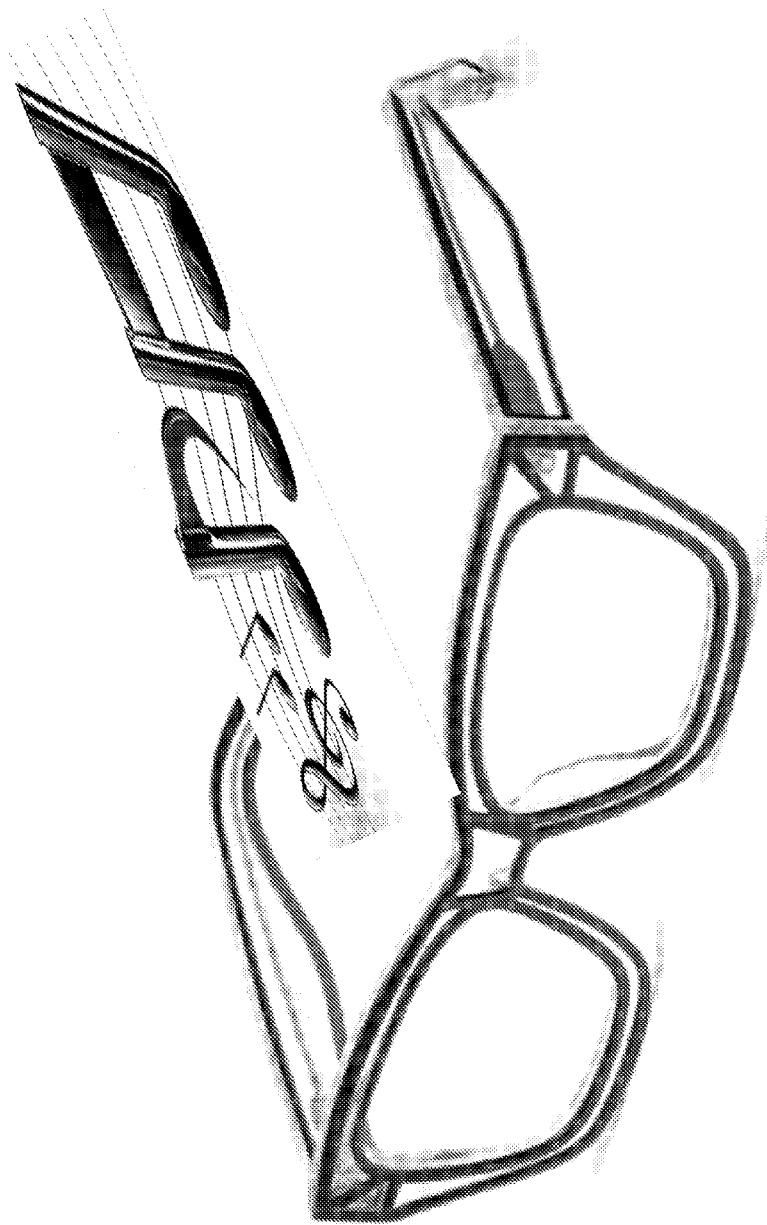

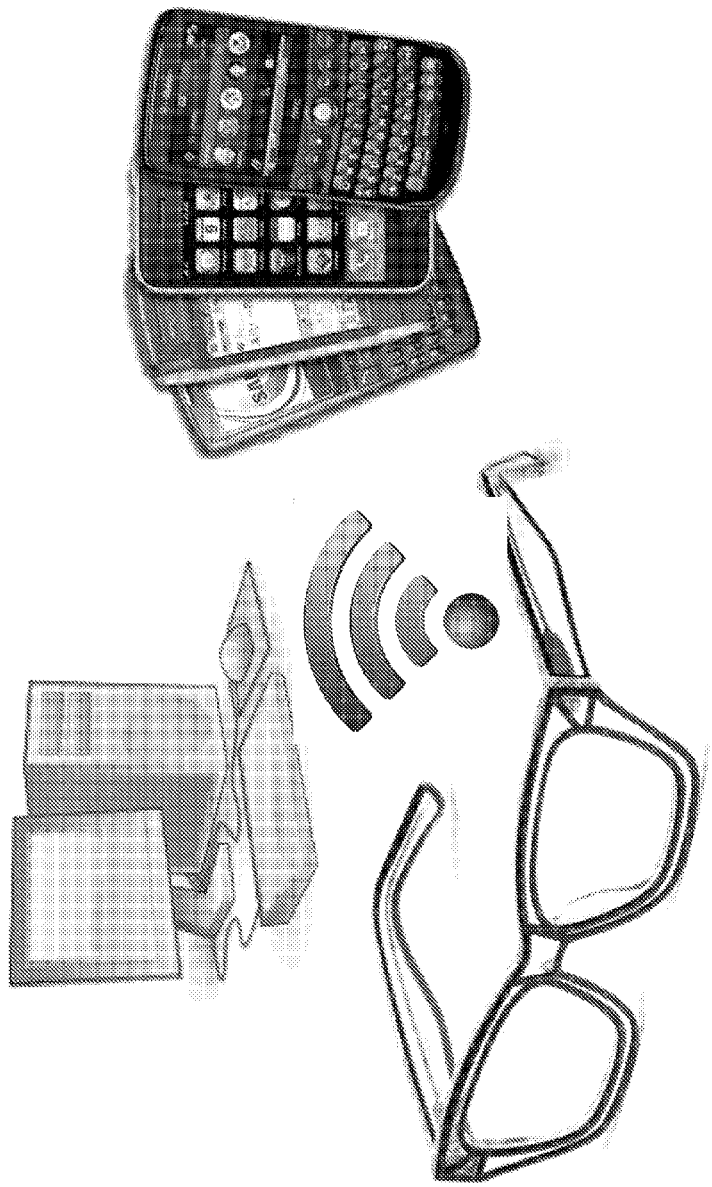

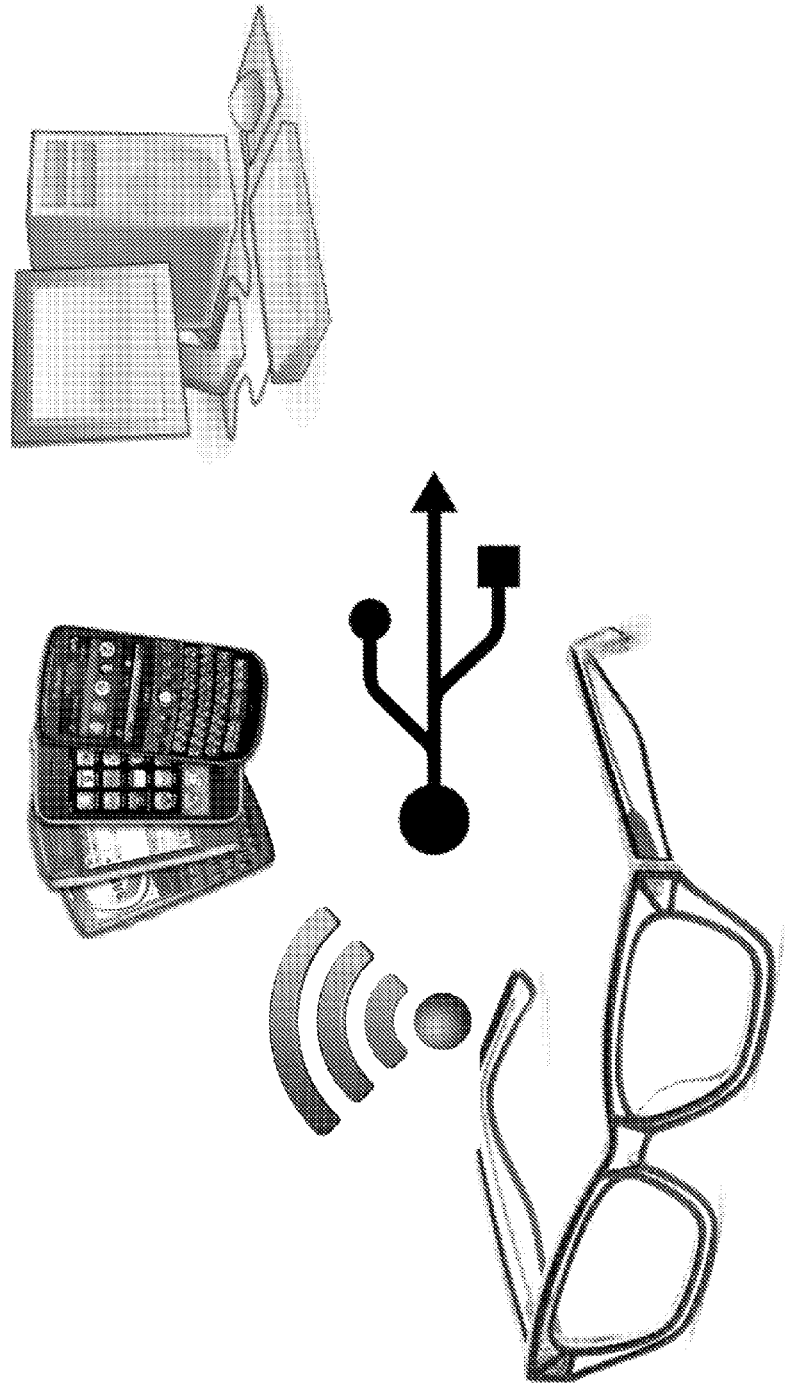

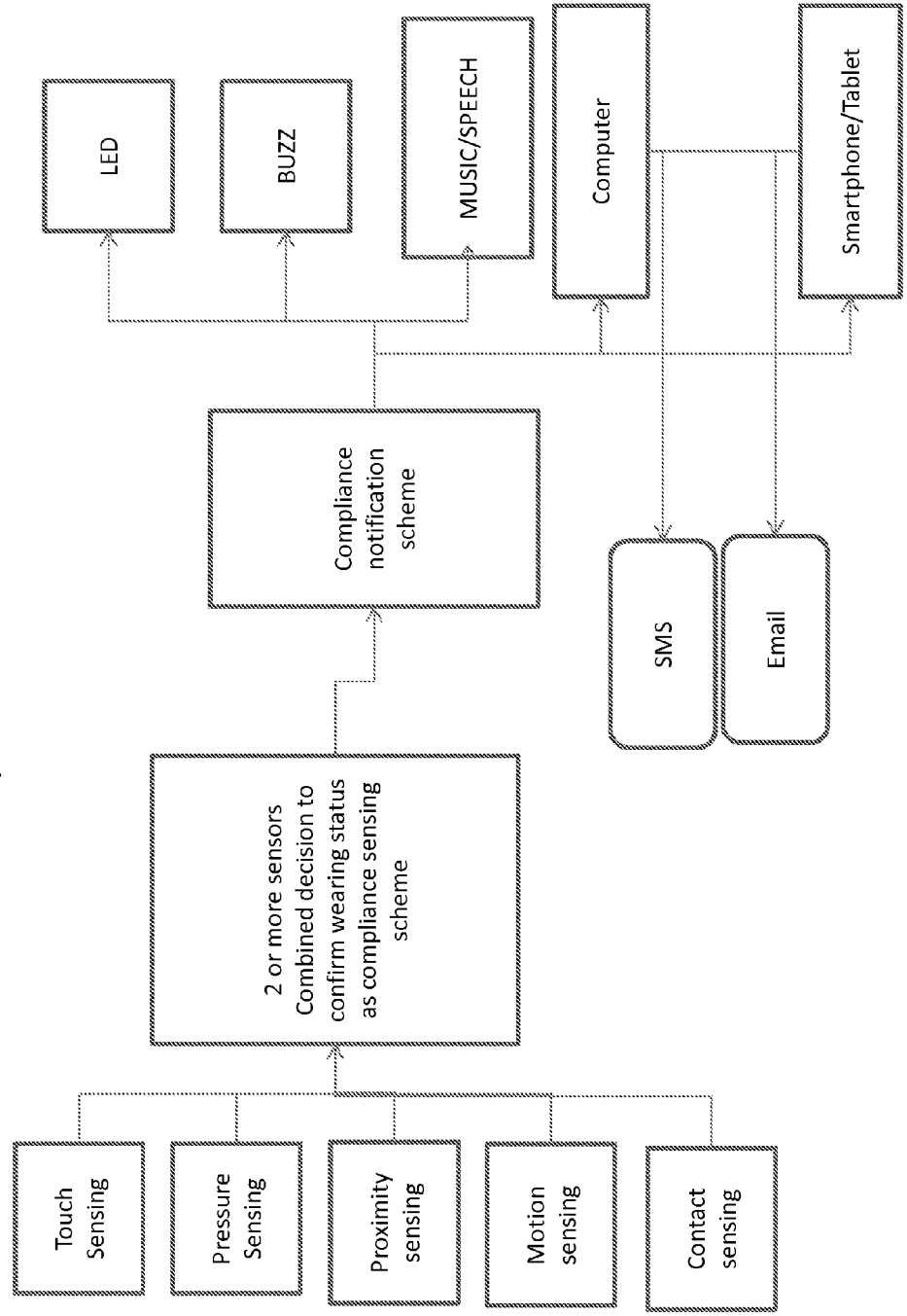

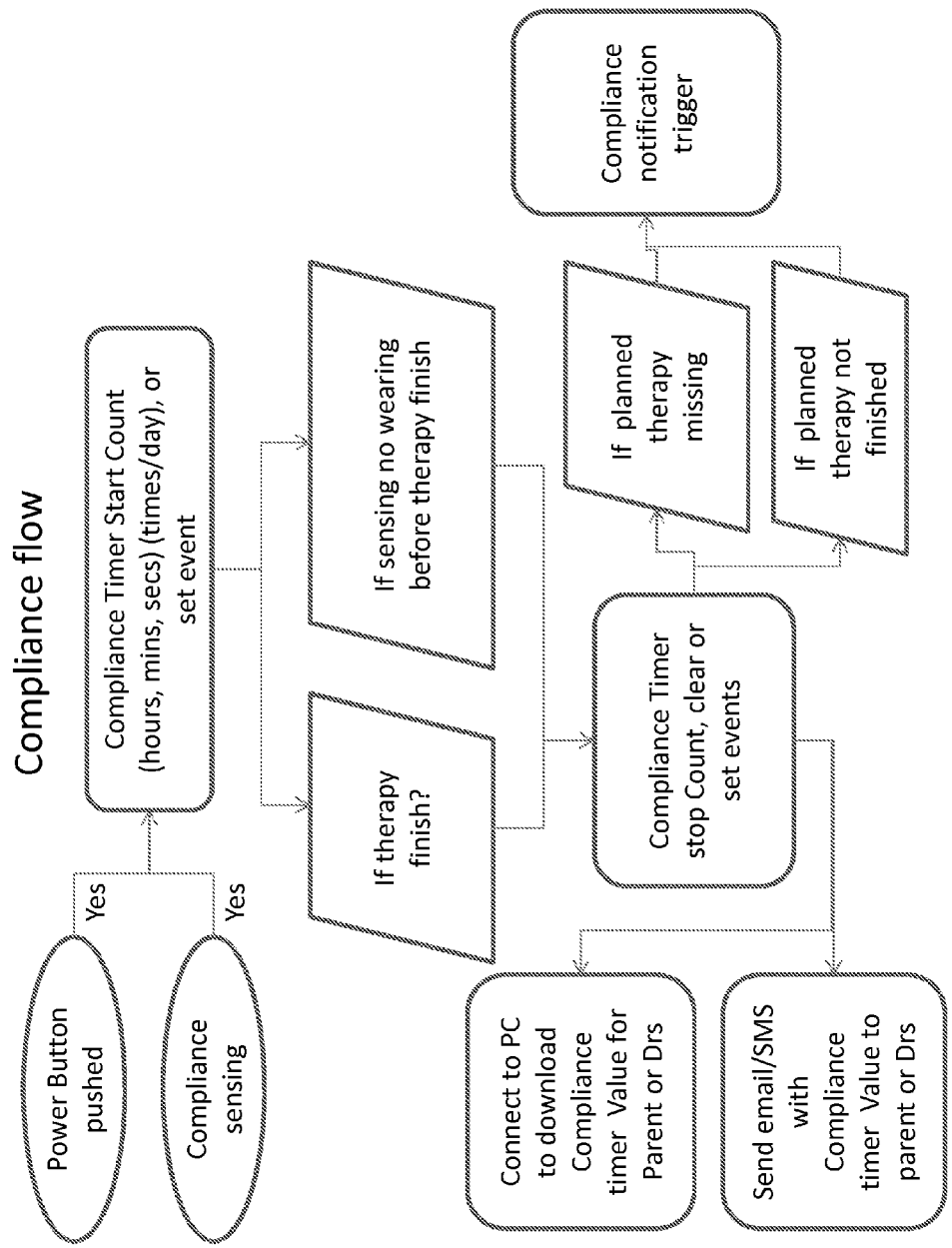

<13mm Bridge distance

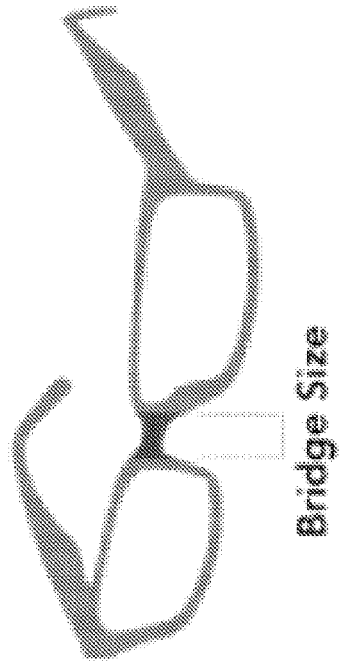

- A bridge measurement is the distance in millimeters between the two lenses. It is measured between the two closest points of the two lenses. Traditional eye glasses Ranges from 14mm–24mm (~ ½"–1")
- Embodiments disclosed herein can use a bridge distance that is smaller than 13mm. Use of a reduced bridge measurement can accommodate for strabismus (cross eye) patient, specially useful for the inward turning which is called esotropia.

What is claimed is:

1. An apparatus, comprising:
   a first lens operable to blank for a first blocking time;
   a second lens operable to blank for a second blocking time; and
   a controller for controllably setting at least one of the first blocking time and the second blocking time; wherein
   the apparatus is configured to be clipped onto a pair of glasses.

2. The apparatus of claim 1, wherein the first lens and the second lens alternate between blocking and non-blocking.

3. The apparatus of claim 2, wherein during the first blocking time, the first lens substantially prevents light from passing through the first lens, and during the second blocking time, the second lens substantially prevents light from passing through the second lens.

4. The apparatus of claim 2, wherein when not operating within the first blocking time, the first lens substantially allows light to pass through the first lens, and when not operating within the second blocking time, the second lens substantially allows light to pass through the second lens.

5. The apparatus of claim 2, wherein the first blocking time is different than the second blocking time.

6. The apparatus of claim 2, wherein a frequency in which at least one of the first lens and the second lens alternates between blocking and non-blocking is adjustable.

7. The apparatus of claim 2, wherein a frequency in which the first lens alternates between blocking and non-blocking is within a range of 1 Hz to 15 Hz.

8. The apparatus of claim 1, wherein the first blocking time and the second blocking time are selected to force an eye of a user of the apparatus to work harder than another eye of the user.

9. The apparatus of claim 1, wherein the apparatus comprises a frame, and the controller is at least partially in the frame.

10. The apparatus of claim 1, wherein at least one of the first lens and the second lens is integrated into a prescription lens.

11. The apparatus of claim 1, further comprising a memory, wherein the memory interfaces with the controller.

12. The apparatus of claim 11, wherein the controller is operative to monitor and store information regarding usage of the apparatus in the memory.

13. The apparatus of claim 11, further comprising the controller operative to select programmable settings from the memory for adjustably controlling at least one of the first blocking time, the second blocking time, or a frequency of blanking of at least one of the first lens and the second lens.

14. The apparatus of claim 1, further comprising the controller operative to adjust a level of blocking of at least one of the first lens and the second lens.

15. The apparatus of claim 1, further comprising an interface, wherein the interface allows the controller to interact with an external controller external to the apparatus.

16. The apparatus of claim 15, further comprising the controller operative to receive programmable instructions from the external controller.

17. The apparatus of claim 16, wherein the programmable instructions control selection of at least the first blocking time, the second block time, or a frequency of blanking of at least one of the first lens and the second lens.

18. The apparatus of claim 15, further comprising the controller operative to provide monitoring or usage information of the apparatus to the external controller.

19. The apparatus of claim 1, further comprising at least one sensor for sensing a user wearing the apparatus.

20. The apparatus of claim 1, further comprising communication circuitry, wherein the controller and the communication circuitry of the apparatus are at least partially in the apparatus.

21. The apparatus of claim 1, further comprising a rechargeable battery.

22. The apparatus of claim 1, further comprising at least one of a visual or an audible indicator for communicating to a user of the apparatus.

23. The apparatus of claim 1, further comprising at least one sensor for sensing a condition of a user of the apparatus.

24. The apparatus of claim 23, further comprising the controller operative to store the sensed condition in memory.

25. A method of providing vision therapy to a user, comprising:
   clipping a shuttering glasses apparatus onto an eyewear;
   blanking a first lens of the shuttering glasses apparatus being worn by the user for a first blocking time;
   blanking a second lens of the shuttering glasses apparatus being worn by the user for a second blocking time;
   controllably setting at least one of the first blocking time and the second blocking time;
   monitoring usage of the shuttering glasses apparatus; and
   storing information regarding the monitored usage in memory.

26. The method of claim 25, wherein the first lens and the second lens alternate between blocking and non-blocking.

27. The method of claim 25, wherein the first blocking time is different than the second blocking time.

28. The method of claim 25, wherein a frequency in which at least one of the first lens and the second lens alternates between blocking and non-blocking is adjustable.

* * * * *